(12) United States Patent
Ma

(10) Patent No.: US 9,070,244 B2
(45) Date of Patent: Jun. 30, 2015

(54) POWER MANAGEMENT FOR AN AUTOMATED BANKING MACHINE

(71) Applicant: Diebold Self-Service Systems, division of Diebold, Incorporated, North Canton, OH (US)

(72) Inventor: Songtao Ma, Wadsworth, OH (US)

(73) Assignee: Diebold Self-Service Systems division of Diebold, Incorporated, Canton, OH (US)

( * ) Notice: Subject to any disclaimer, the term of this patent is extended or adjusted under 35 U.S.C. 154(b) by 0 days.

(21) Appl. No.: 14/053,148

(22) Filed: Oct. 14, 2013

(65) Prior Publication Data

US 2014/0103109 A1    Apr. 17, 2014

Related U.S. Application Data

(60) Provisional application No. 61/795,236, filed on Oct. 12, 2012.

(51) Int. Cl.
*G06K 7/00*   (2006.01)
*G07F 19/00*  (2006.01)

(52) U.S. Cl.
CPC .............. *G07F 19/201* (2013.01); *G07F 19/20* (2013.01)

(58) Field of Classification Search
USPC ................... 235/375, 379, 380; 705/5, 35–45
See application file for complete search history.

(56) References Cited

U.S. PATENT DOCUMENTS

| | | | |
|---|---|---|---|
| 6,203,000 B1 * | 3/2001 | Hill | 270/58.11 |
| 6,344,906 B1 * | 2/2002 | Gatto et al. | 358/443 |
| 7,942,313 B1 | 5/2011 | Grimm et al. | |
| 7,959,072 B1 | 6/2011 | Jenkins et al. | |
| 8,448,849 B1 | 5/2013 | Jenkins et al. | |
| 8,544,730 B2 | 10/2013 | Ma et al. | |
| 2001/0002468 A1 * | 5/2001 | Nel | 705/26 |
| 2010/0219783 A1 | 9/2010 | Noie | |
| 2012/0145782 A1 | 6/2012 | Ma et al. | |
| 2012/0226610 A1 | 9/2012 | Gill et al. | |

FOREIGN PATENT DOCUMENTS

EP    0 795 842 B1    6/2002

* cited by examiner

*Primary Examiner* — Matthew Mikels
(74) *Attorney, Agent, or Firm* — Black McCuskey Souers & Arbaugh, LPA

(57) ABSTRACT

An automatic banking machine operates responsive to data read from data bearing records corresponding to authorized user or financial account data. The machine includes a card reader for reading data from user cards. The automated banking machine causes financial transfers related to financial accounts that correspond to data read from user cards. The automated banking machine also includes devices that control the supply of power to included devices to avoid exceeding power supply capacity.

11 Claims, 15 Drawing Sheets

TRADITIONAL STEPPER MOTOR DRIVE

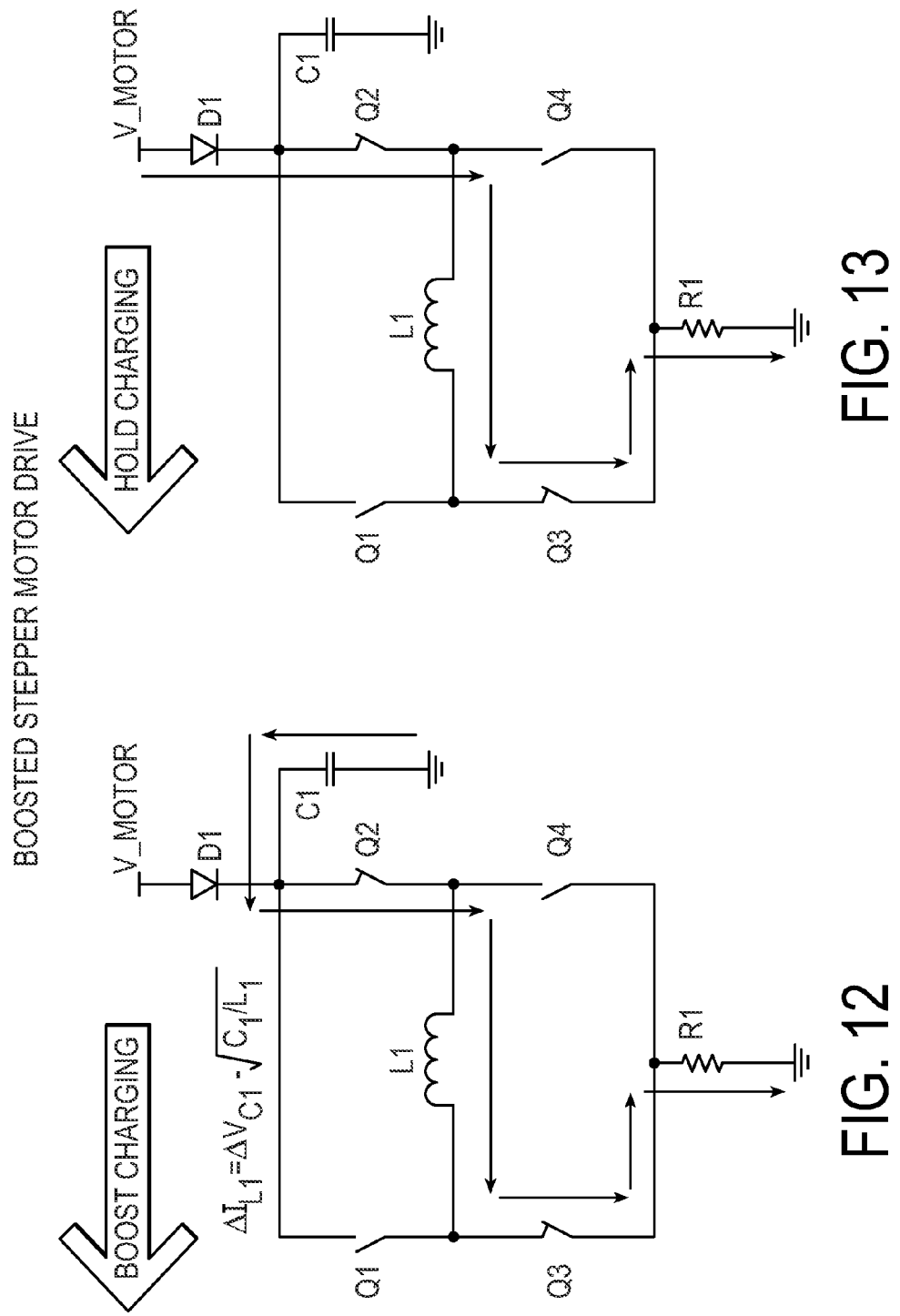

POWER MANAGEMENT FOR AN AUTOMATED BANKING MACHINE

CROSS REFERENCE TO RELATED APPLICATIONS

This application, pursuant to 35 U.S.C. §119(e), claims the benefit of Provisional Application 61/795,236 filed on Oct. 12, 2012, the contents of which are hereby incorporated by reference.

TECHNICAL FIELD

This invention relates to managing the power consumption of an automated banking machine.

BACKGROUND

Automated banking machines, frequently referred to as Automated Teller Machines or "ATMs," may include a card reader that operates to read data from a bearer record such as a user card. Automated banking machines may operate to cause the data read from the card to be compared with other computer stored data related to the bearer or their financial accounts. The machine operates at least in part in response to the comparison determining that the bearer record corresponds to an authorized user, to carry out at least one transaction which may be operative to transfer value to or from at least one account. A record of the transaction is often printed through operation of the automated banking machine and provided to the user. Automated banking machines may be used to carry out transactions such as dispensing cash, the making of deposits, the transfer of funds between accounts and account balance inquiries. The types of banking transactions that may be carried out are determined by the capabilities of the particular banking machine and system, as well as the programming of the institution operating the machine.

BRIEF DESCRIPTION OF THE DRAWINGS

FIG. 12 is a circuit diagram of an example embodiment of a bipolar stepper motor drive illustrating an example boost-charging process.

FIG. 13 is a circuit diagram of an example embodiment of a bipolar stepper motor drive illustrating an example hold-charging process.

OVERVIEW OF EXAMPLE EMBODIMENTS

Figure 1:
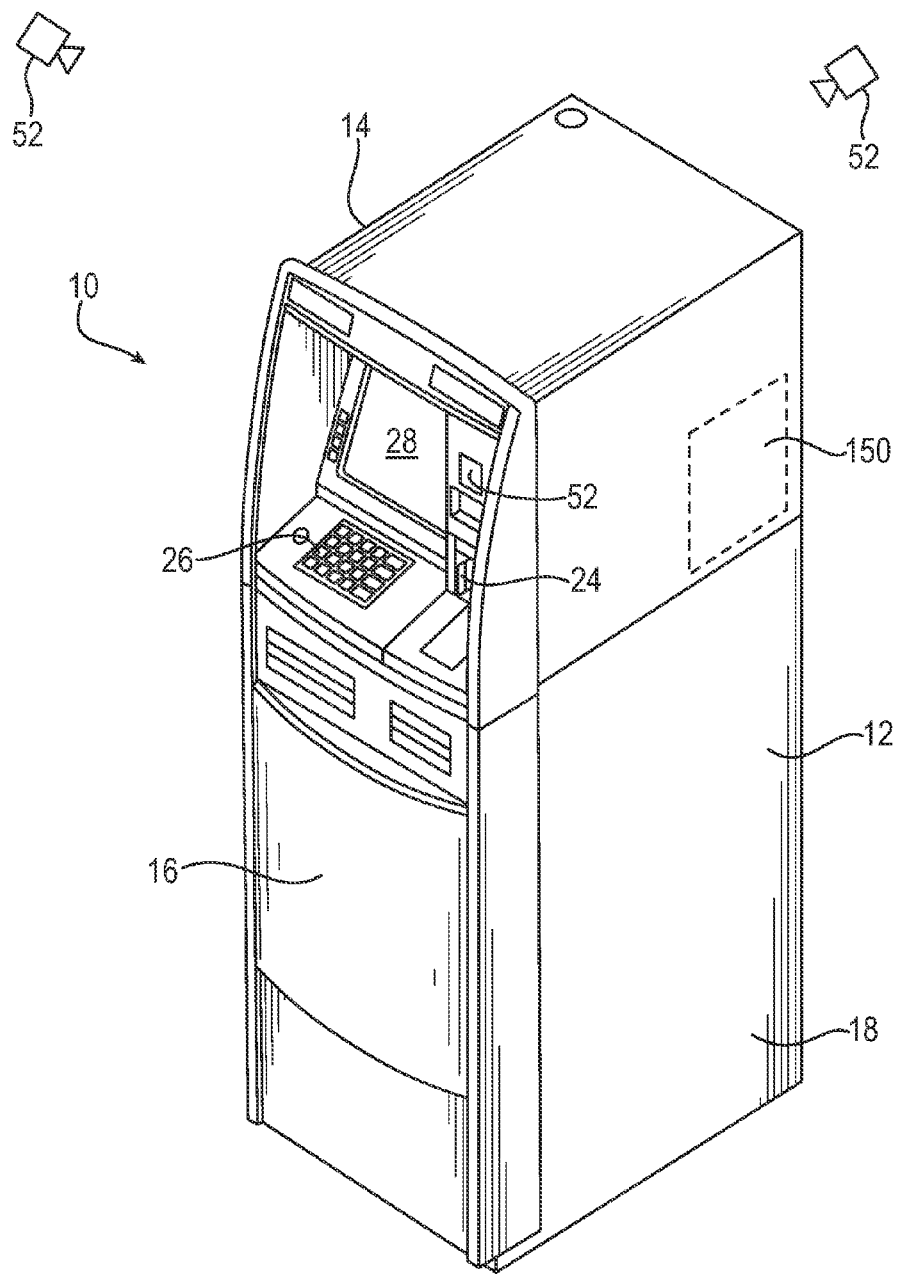
FIG. 1 is a schematic representation of an example automatic banking machine upon which an example embodiment may be implemented.

The following presents a simplified overview of the example embodiments in order to provide a basic understanding of some aspects of the example embodiments. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented later.

In accordance with an example embodiment, there is disclosed herein, an apparatus comprising a power supply, a power controller coupled with the power supply, a dispensing mechanism coupled with the power controller, a stepper motor coupled with the dispensing mechanism and the power controller, the stepping is operable to operate the dispensing mechanism, and a transaction processor coupled with the power controller. The transaction processor is operable to operate the stepper motor to operate the dispensing mechanism for a transaction.

DESCRIPTION OF EXAMPLE EMBODIMENTS

This description provides examples not intended to limit the scope of the appended claims. The figures generally indicate the features of the examples, where it is understood and appreciated that like reference numerals are used to refer to like elements. Reference in the specification to "one embodiment" or "an embodiment" or "an example embodiment" means that a particular feature, structure, or characteristic described is included in at least one embodiment described herein and does not imply that the feature, structure, or characteristic is present in all embodiments described herein.

Referring now to the drawings and particularly to FIG. 1 there is shown therein an example embodiment of an automated banking machine that operates to cause financial transfers using information read from data bearing records in the form of user cards generally indicated 10. In the example embodiment automated banking machine 10 is an ATM, however the features described and claimed herein are not limited to any particular type of automated banking machine. The example machine includes a housing 12. In the embodiment shown, housing 12 includes an upper housing area 14 and a lower housing area 16 including a secure chest portion 18. Access to an interior area of the chest portion 18 is controlled by a chest door 20 (see FIG. 2) which when unlocked by authorized persons, enables gaining access to the interior area 22 of the chest area. In an example embodiment, access to the upper housing area 14 may be made through an appropriate opening in the housing 12. The opening to the interior area of the upper housing portion may also be controlled by a movable door. In example embodiments, the opening may be in a front, rear or side of the housing. In other embodiments, the housing may include several openings to the interior area. In an example embodiment, the chest door 20 may be situated at the front of the housing, for so called "front-load" machines or at the rear of the housing for "rear-load" machines. Examples of banking machine housing structures are shown in U.S. Pat. Nos. 7,156,296; 7,156,297; 7,165,767; and 7,004,384 the disclosures of which are incorporated herein by reference in their entirety.

An example embodiment includes devices and methods operable as a video and audio system to support service personnel in servicing a machine, as explained in further detail below. In an example embodiment, the machine 10 includes a number of transaction function devices that must be serviced from time to time. These transaction function devices are associated with components of the machine such as a card reader 24 and a keypad 26. The card reader and keypad serve as input devices through which users can input instructions and information. It should be understood that as referred to herein the keypad may include function keys or touch screen areas which may be used in example embodiments to input data into the machine. Machine 10 further includes a visual display 28 generally operative as an output device to provide information to users of the machine. The information provided may include information concerning cash dispensing transactions. The card reader is used to read data from user cards that can be used to identify customer financial accounts to the machine. In some embodiments the card reader may be a magnetic stripe type reader. In other embodiments the card reader may be a smart card reader, a contactless reader such as a radio frequency identification (RFID) reader, an NFC reader or other wireless communication port.

Figure 2:
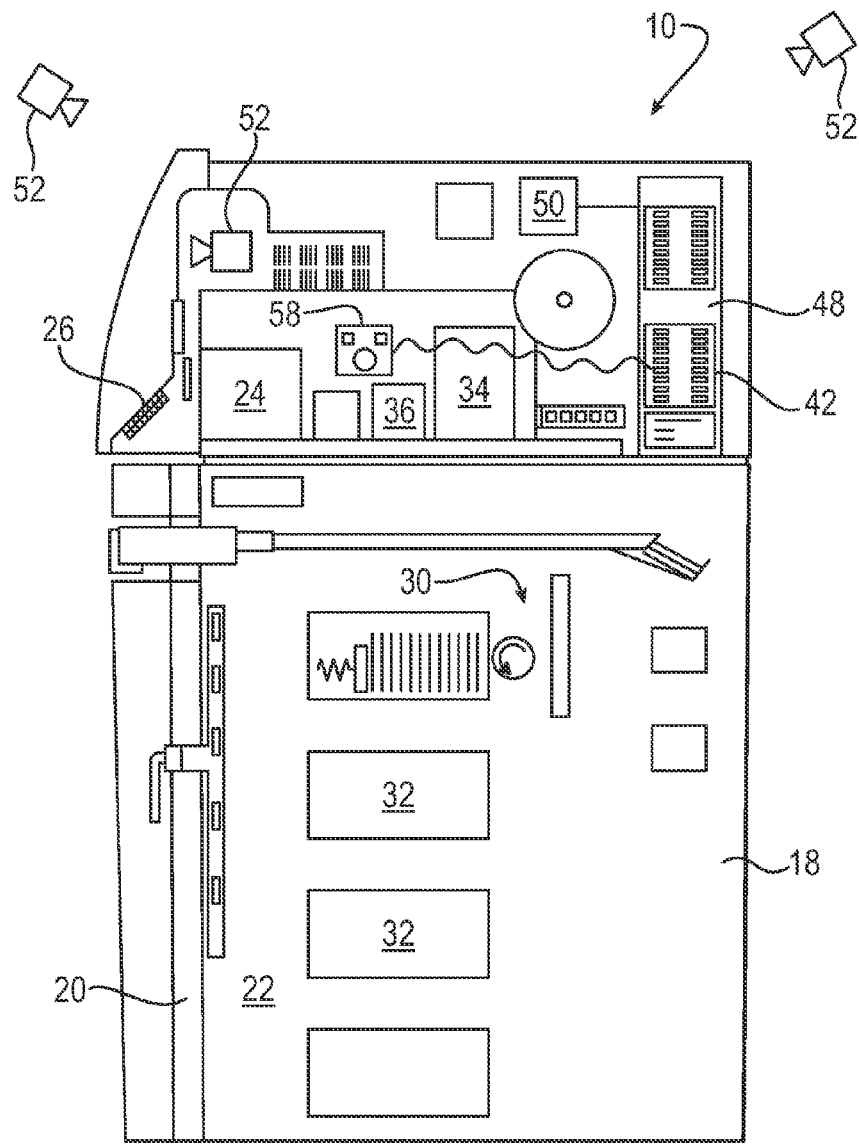
FIG. 2 is a schematic side view of the example automatic banking machine of FIG. 1.

FIG. 2 shows a schematic view of an example hardware configuration of an example machine. Machine 10 includes additional transaction function devices. Such transaction function devices may include a document dispensing mechanism, including a dispenser, schematically indicated 30, which operates to cause sheets such as currency bills or other documents of value stored within the machine to be delivered from or otherwise made accessible from outside the machine to a machine user. Such mechanisms are referred to herein as a cash dispenser. Examples of such cash dispensers are shown in U.S. Pat. Nos. 7,121,461; 7,131,576; 7,140,537; 7,140,607; 7,144,006; 7,000,832; and 8,052,044 the disclosures of which are incorporated herein by reference in their entirety.

The example machine 10 further includes a depository 32. The depository 32 accepts deposits such as cash or other instruments such as checks from customers. It should be understood that in other example embodiments other types of depositories which accept various types of items representative of value may be used. Examples of depository devices are shown in U.S. Pat. Nos. 7,044,366; 7,156,295; 7,137,551; 7,150,394; 7,021,529; 8,052,046; and 8,061,591 the disclosures of which are incorporated hereby by reference in their entirety. Example machines may also include a note acceptor of the types described in the incorporated disclosures. The example embodiments may include a printer 34 operative to print customer receipts related to the transaction. The example embodiments may include other transaction function devices, such as a coin dispenser, coin acceptor, currency stacker, ticket accepting devices, stamp accepting devices, card dispensing devices, money order dispensing devices, and other types of devices which are operative to carry out transaction functions. Some of these devices may be located in the upper or lower housing areas, all generally schematically represented as 36. It should be understood that the machine shown in the drawings is merely illustrative and automated banking machines of various embodiments may include a variety of transaction function devices and component configurations.

Figure 3:
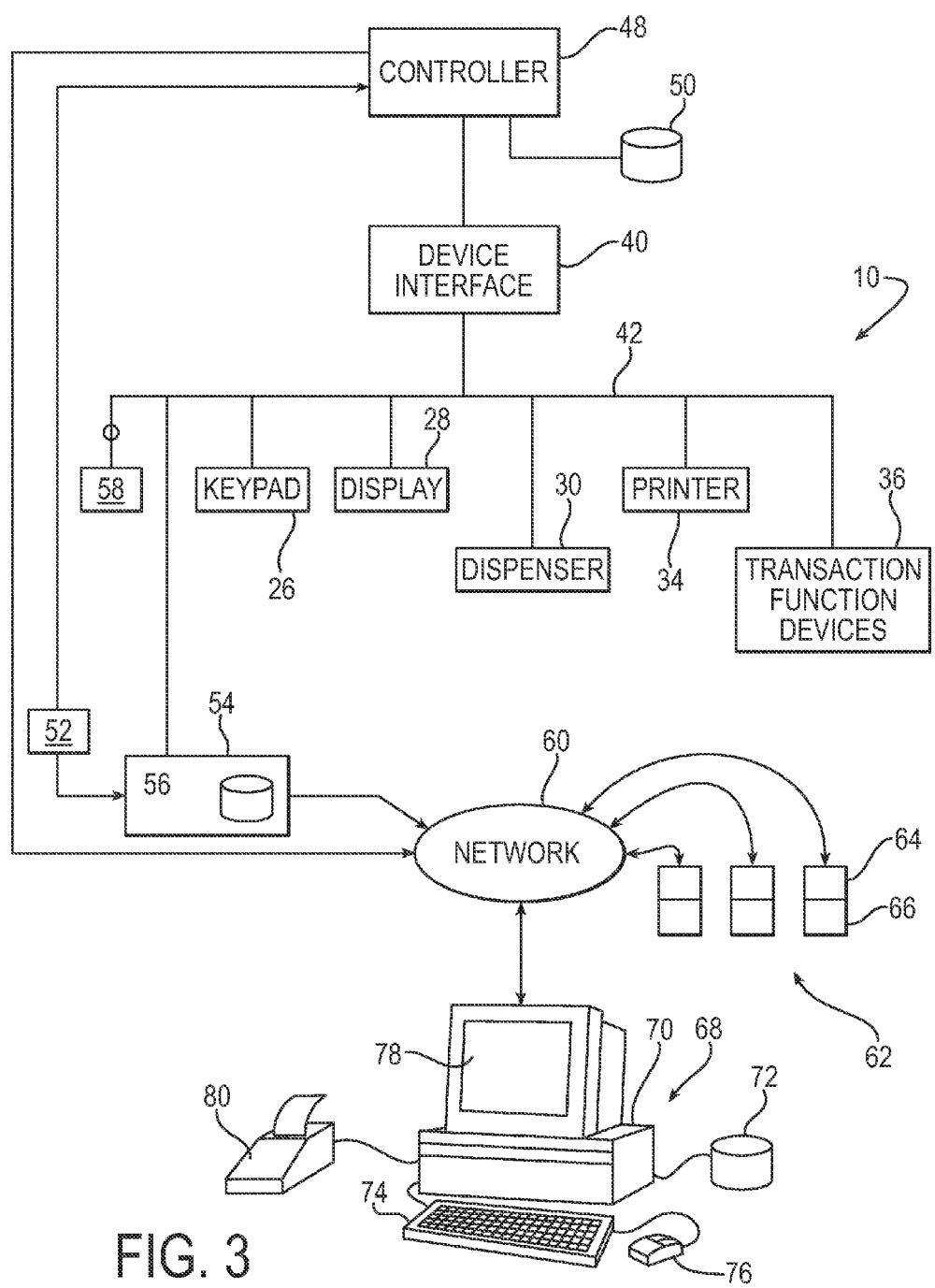
FIG. 3 is a schematic view of a control system for devices within an automatic banking machine.

In an example embodiment, one or more of the transaction function devices, i.e., keypad 26, display 28, dispenser 30, printer 34, or other devices 36 communicate through and are operated responsive to signals passed through device interfaces schematically represented as 40 (see FIG. 3). The device interfaces communicate with the transaction function devices on an interface bus 42 which in example embodiments may be a universal serial bus (USB). The messages which control operation of the various transaction function devices are communicated through the interface bus 42. At least one computer which is also referred to as a terminal controller or processor 48 operates the machine by communicating messages to the device interfaces to control the transaction function devices.

For purposes of simplicity, this example embodiment will be described as having a single controller 48 which controls the operation of devices within the machine. However, it should be understood that such reference shall be construed to encompass multi-controller and multiprocessor systems as may be appropriate in controlling the operation of a particular machine. For example some embodiments may operate using principles described in U.S. Pat. No. 6,264,101 or 6,131,809 or U.S. patent application Ser. No. 13/066,272 filed Apr. 11, 2011 the disclosures of which are incorporated herein by reference in their entirety. The controller is alternatively referred to herein as a terminal processor. As schematically represented, the controller 48 is in operative connection with one or more data stores 50. Such data stores may include for example, articles bearing computer executable instructions such as hard drives, flash memory, firmware or other data storage devices. Such data stores 50 in example embodiments are operative to store computer executable program instructions, values and other information used in the operation of the machine.

With reference to FIGS. 1 and 2, the example embodiment may further include image capture devices such as cameras 52 which provide camera signals representative of what is observed within the field of view of the respective camera. The image capture devices such as cameras 52 may be arranged so as to capture images of portions of the machine, portions of users of the machine, portions of servicers of the machine, or portions of the environment around the machine. For example, an image capturing device 52 may be mounted in supporting connection with the housing of the machine with a field of view encompassing a machine user's face. Another image capturing device may be mounted relative the machine with a field of view of the environment immediately behind a machine user. The field of view of other image capturing devices may encompass areas of the machine accessed by service personnel within the respective fields of view of the devices. It should be understood that the camera configuration shown is example. It should further be understood that embodiments may include analog cameras, digital cameras, iris scanners, fingerprint scanners or other types of devices from which data corresponding to images may be acquired and/or reproduced. Some embodiments may operate in a manner that employs the principles described in U.S. Pat.

No. 7,147,147 or U.S. patent application Ser. No. 13/068,592, the disclosures of which are incorporated herein by reference in their entirety.

The images captured by camera(s) 52 may be used, for example, to verify identity and/or provide security for the machine or users thereof. In an example embodiment, the data store 50 may include data corresponding to images of unauthorized users of the machine. In an example embodiment, the controller 48 is able to compare data corresponding to the images captured by camera(s) 52 with data in the data store corresponding to unauthorized users. If the data generated by camera(s) 52 corresponds to unauthorized user data in the data store, the controller is operative to carry out instructions, such as to activate an indicator which indicates the presence of the unauthorized user. The indicator may be an audible alarm, a message to a remote entity, a machine shut-down operation, or any other action able to indicate attempted use of or access to the machine by an unauthorized user. Alternatively, in some example embodiments the data store may be located at the machine or accessed through communications to one or more computers at remote locations. In other embodiments the stored data may correspond to authorized users. Determining through operation of one or more controllers that image data corresponds to an authorized user may permit such authorized users to carry out certain operations. Of course these approaches are example.

In the example embodiment, machine 10 also includes a movable image capture device 58 such as a camera, in operative connection with interface bus 42. When the machine is in an operational mode, movable device 58 may be housed within the upper housing area. Alternately, a movable device may be housed within the lower housing area. Alternatively in some embodiments, the image capture device may be brought to the machine by a servicer and operatively connected to at least one controller, such as by plugging in a cable connected to a camera to a USB port. After a servicer attains access to the interior of the machine housing, the movable device 58 may be utilized to aid servicing of machine components as described in greater detail below.

As schematically illustrated in FIG. 3, in some example embodiments, signals from the camera 52 may be sent to an image recorder device 54 which is connected to the interface bus 42. Image recorder device 54 includes a computer which includes at least one server operating therein, and further includes at least one data store 56. It should be understood that some embodiments may include devices which in addition to image data, acquire sound data, infrared signal data, and other types of data which can be sensed by sensing devices, stored, recovered, and analyzed by the system. This may include for example, sensing images which indicate the relative temperatures of various portions of parts, which temperatures may correspond to abnormal conditions. Image recorder device 54 may also receive inputs from devices such as sensors which can generally sense actions or conditions directly. Image recorder 54 may also receive signals representative of conditions or instructions sent as signals to other devices such as signals on the interface bus 42, timing signals, or others signals usable to operate the image recorder responsive to programmed instructions, time parameters, user inputs, or other conditions or signals. At least one server software function associated with the image recorder device 54 may be in communication with at least one electronic communications network schematically indicated 60. The server may operate to provide at least one uniform resource locator (URL) or other system communication address. Thus, the server may be accessed by other terminals connected to the network. The server may also selectively deliver messages to other network connected computers. The camera signals may alternately, or additionally, be sent to controller 48.

In an example embodiment, terminal controller 48 is in communication with at least one network 60 and is able to be accessed by other terminals connected to the network, as well as able to deliver messages including data corresponding to visual images generated by camera 52 and movable image capture device 58 to connected terminals.

Network 60 may include a local area network such as an intranet or may be a wide area network such as the Internet. Network 60 may include a network that communicates messages in protocols such as TCP/IP. The network may be used to further communicate HTTP messages including records such as HTML, XML, and other markup language documents. Example principles that may be used are described in U.S. Pat. Nos. 7,159,144; 7,162,449; 7,093,749; and 7,039,600 which are incorporated herein by reference in their entirety. Of course, in other embodiments other communications methods may be used.

In the example embodiment shown, a plurality of terminals 62 are shown connected to the at least one network 60. Terminals 62 may include user terminals which may be used to analyze, store, and recover data sent from the machine. Alternative terminals 62 may include document verification terminals for verifying the authenticity of documents, identifying user data or for carrying out other functions. Typically terminals 62 include computers including a browser software component 64 such as Mozilla Firefox™, Mozilla Thunderbird™, Microsoft Internet Explorer™, Google Chrome™ or other types of browsers. Terminals 62 also include other software and hardware components schematically indicated 66 suitable for processing image data, transaction data, and other data that may be obtained by accessing the machine.

Example terminal 68 may be a user terminal, document verification terminal, data storage terminal, data analysis terminal, or other type of terminal for inputting instructions or analyzing data available in the system. Example terminal 68 includes a computer schematically indicated 70 which includes at least one processor and an associated data store schematically indicated 72. The computer 70 may be located within the machine. Alternatively, the computer may be located in a server or other device remote from the machine. For example, the computer may be located in a server that is operatively connected to the machine and also to other machines. For example in some embodiments the server may operate a virtual machine that communicates with devices in the machine to control operation of such devices in the manner of the incorporated disclosure.

Example terminal 68 may be in operative connection with the computer 70 and input devices 74 and 76 which include a keyboard and mouse respectively in the embodiment shown. Of course in other embodiments other types of input devices may be used. Example terminal 68 further includes output devices. The output devices in the example embodiment shown include a monitor with a display 78 and a printer device 80. Of course in other embodiments of terminals other types of output devices may be used. The example terminal 68 includes a computer with a browser component as previously described. The browser in the terminal communicates with the machine through the network 60. Terminal 68 may also have server software operating therein as well as other software components.

It should be understood that in some embodiments the machine may communicate with other computers and entities and through various networks. For example, the machine may communicate with computers operated by service providers through network 60. Such service providers may be entities to be notified of status conditions or malfunctions of the machine as well as entities who are to be notified of corrective actions. This may be done, for example, in the manner similar to that described in U.S. Pat. Nos. 7,036,049 and 7,003,492 the disclosures of which are incorporated herein by reference in their entirety. Other third parties who may receive notifications from example machines include entities responsible for delivering currency to the machine to assure that the currency supplies are not depleted. Other entities may be responsible for removing deposit items from the machine. Alternative entities that may be notified of actions at the machine may include entities which hold marketing data concerning consumers and who provide messages which correspond to marketing messages to be presented to consumers. Various types of messages may be provided to remote systems and entities by the machine depending on the capabilities of the machines in various embodiments and the types of transactions being conducted.

Figure 4:
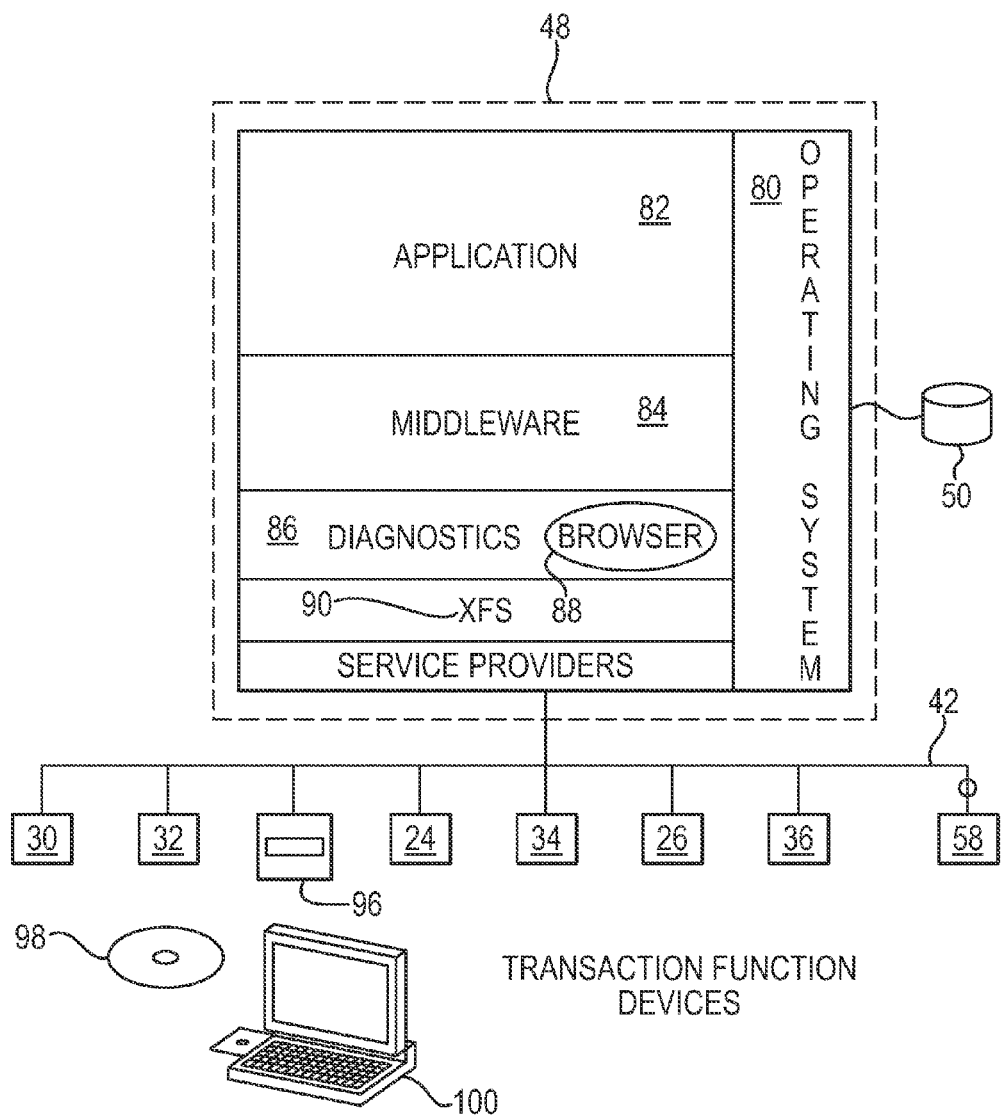
FIG. 4 is a schematic view showing an example software architecture.

FIG. 4 shows schematically an example software architecture which may be operative in the controller 48 of the machine. The example software architecture includes an operating system 80 such as for example Microsoft® Windows, IBM OS/2® or Linux. The example software architecture also includes a banking machine application 82. The example application 82 includes the instruction for the operation of the automated banking machine and may include, for example, an Agilis® 91x application that is commercially available from Diebold, Incorporated. The example software application operates machines, and may in some embodiments include a cross vendor application that is suitable for use in multiple brands of automated banking machines.

In an example embodiment, a middleware software layer schematically indicated 84 is operative in the controller 48. In the example embodiment, the middleware software layer 84 operates to compensate for differences between various types of automated banking machines and transaction function devices used therein. The use of a middleware software layer 84 enables the more ready use of an identical software application on various types of banking machine hardware. In the example embodiment the middleware software layer 84 may be Involve® software produced by Nexus Software or Kalignite which is a product of Korala Associates Ltd. of Scotland.

The example software architecture further includes a diagnostics layer 86. The diagnostics layer 86 is operative to enable accessing and performing various diagnostic functions of the devices within the banking machine. In the example embodiment, the diagnostics layer 86 operates in conjunction with a browser 88. The diagnostics layer may be in operative connection with various components which enable diagnostic functioning of the various transaction function devices. Other example embodiments may include diagnostic applications as described in more detail in U.S. Pat. Nos. 7,104,441; 7,163,144; 7,093,749; and 6,953,150 the disclosures of which are incorporated herein by reference in their entirety. For illustrative purposes, the example embodiment is described in terms of a software diagnostic layer 86 as schematically represented in FIG. 4. In the example embodiment, at least one data store 50 is in operative connection with the controller 48 such that one or more data stores include status data which is associated with the status or conditions of serviceable components and/or diagnostic data associated with conditions or properties of at least one serviceable component. In an example embodiment, the diagnostic data may be accessed when a diagnostic article 98 is placed in operative connection with the banking machine as explained in further detail below.

As schematically represented in FIG. 4, controller 48 is in operative connection with at least one interface bus 42 which may be a universal serial bus (USB) or other standard or nonstandard type of bus architecture. The interface bus 42 is schematically shown in operative connection with one or more transaction function devices. The transaction function devices may include, for example, the currency dispenser 30, depository 32, card reader 24, receipt printer 34, keypad 26, as well as numerous other devices, generally designated 36, which are operative in the machine and controlled by the controller 48 to carry out transactions. In the example embodiment, an image capture device 52 such as a charge-coupled device (CCD) camera is operatively connected to interface bus 42. In the example embodiment one of the transaction function devices in operative connection with the controller is a diagnostic article reading device 96 which is operative to read a diagnostic article 98 used in servicing the machine. In an example embodiment, the diagnostic article 98 comprises a CD which can be read by reader 96, and can also be read by a computer device 100 which is not generally associated with the operation of the banking machine. Of course in other embodiments the diagnostic article may include local or remote items that can provide computer readable instructions, such as, for example, flash memory cards, smart cards, RFID cards, tokens or other articles.

In the example embodiment, the diagnostics layer 86 is operative to perform various diagnostic functions with the transaction function devices, i.e., 24, 26, 30, 32, 34, 36, 96 which are operative in the banking machine. In the example embodiment, the diagnostic layer 86 is enabled to perform manipulations and diagnostic testing of the transaction function devices. In an example embodiment, the diagnostic layer works in conjunction with the diagnostic article 98. The manipulations and/or diagnostic tests may include for example outputting an audible tone, turning on a motor, simulating inputs through a keypad, printing a test receipt, operating the cash dispenser and the like.

Figure 5:
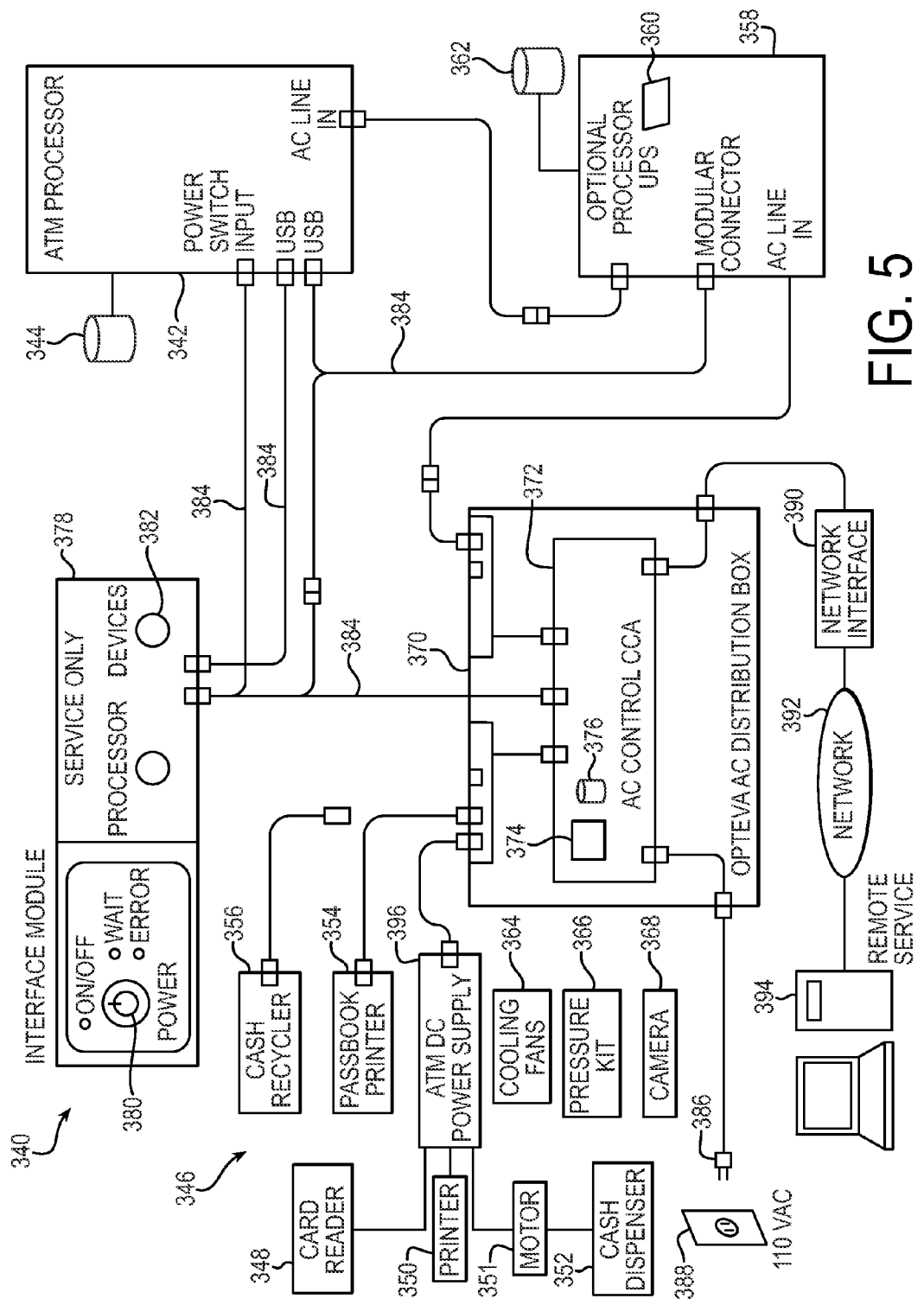
FIG. 5 is a schematic representation of a power control system for use in an example automated banking machine.

The schematic representation of components included in an example automated banking machine 340 are represented in FIG. 5. The components of the automated banking machine 340 represented in FIG. 5 specifically correspond to components used for providing and shutting off electrical power to devices within the machine. The components of the example embodiment are also used in connection with coordinating electrical power supply functions within the machine as well as providing remote status notification and remote control of power functions. Of course it should be understood that this embodiment is example.

Automated banking machine 340 includes a controller or terminal processor 342. The terminal processor is in operative connection with one or more data stores schematically represented 344. Although the example embodiment is described as used in connection with a single terminal processor, it should be understood that the principles described may be used with automated banking machines having multiple terminal processors or other processors. The automated banking machine also includes a plurality of transaction function devices schematically represented 346. Example transaction function devices include a card reader 348, a printer 350 and a cash dispenser 352. Other example transaction function devices shown include a passbook printer 354 and a cash recycler 356. Other example transaction function devices include a note acceptor which may be of the type described in the incorporated disclosures. It should be understood that these transaction function devices are example, and in other embodiments other or different types of transaction function devices may be included in the banking machine.

As can be appreciated, in the example embodiment the terminal processor 342 executes software instructions included in the at least one data store 344 related to the conduct of financial transactions. The terminal processor 342 is operative to cause operation of the transaction function devices 346 to carry out such transactions. The terminal processor 342 communicates through a suitable control bus or other communications methodology with devices within the machine in the manner described.

The example automated banking machine further includes an uninterruptible power supply (UPS) 358, which in particular embodiments can be a battery. In the illustrated example embodiment, the UPS 358 includes a processor 360 which is in operative connection with a data store 362. The UPS 358 operates to supply power when power from an external source is otherwise not available. The example automated banking machine further includes other devices which utilize electrical power. In this example embodiment devices such as cooling fans 364, air pressure control devices 366 and cameras 368 are shown. It should be understood that these devices are merely example of numerous devices that consume electrical power that may be included in the example banking machines. The example embodiment further includes a power controller schematically represented 370. Power controller 370 includes control circuitry 372. The control circuitry includes at least one processor 374. Processor 374 is in operative connection with at least one data store 376. The automated banking machine further includes a power interface module 378. Power interface module 378 includes one or more input devices schematically represented 380. In the example embodiment the at least one input device 380 includes a rotatable switch. The switch enables a user to provide inputs which correspond to selectable conditions. Of course it should be understood that in other embodiments other approaches may be used. The power interface module further includes output devices 382. In the example embodiment the output devices are operative to indicate status information related to the power control system.

As can be appreciated, in the example embodiment the terminal processor 342, power interface module 378, power controller 370, UPS 358 and transaction function devices 346 are all within the housing of the automated banking machine. Further the power controller interface module 378, terminal processor 342 and UPS 358 are operative to communicate within the housing through communication lines schematically indicated 384. In the example embodiment, Universal Serial Bus (USB) communications are used. Of course this approach is example. In the example embodiment the power controller is in operative electrical connection with an electrical connector or other device for receiving electrical power which extends outside the housing of the automated banking machine. This electrical connection is schematically represented by a plug or a connector 386. In the example embodiment the connector 386 is releasable connectable with a source of AC power schematically indicated 388. In the example embodiment the source of AC power comprises an electrical outlet which provides 110 volts of alternating current. However, it should be understood that this approach is example and in other embodiments other approaches may be used.

In the example embodiment the power controller 370 is also in operative communication with a network interface schematically indicated 390. In the example embodiment the network interface is a suitable communications card, modem or other device within the machine that is operative to enable the communication of messages between the automated banking machine and remote devices. It should be understood that although the network interface is only shown in operative connection with the power controller, in example embodiments the network interface is operative to provide communications with other components of the machine. This may include for example the communications that relate to the conduct of transactions using the machine as previously discussed. Of course this configuration is example and in other embodiments other approaches may be used.

In the example embodiment the network interface of the machine is in operative connection with at least one external network schematically indicated 392. Network 392 may be one or more suitable public or private networks which enable communications between the automated banking machine and one or more remote servers 394. Further it should be understood that in some embodiments the network may include the Internet or other data or telecommunications network.

In the example embodiment power from the AC power source 388 is controlled and distributed in the example machine through operation of the power controller 370. As can be seen in FIG. 5 the power controller is operative to provide AC power to the UPS 358. The UPS is operative to provide AC power that is input to the terminal processor 342. The power controller 370 is also operative to supply power to the transaction function devices 346. As indicated schematically, power to the transaction function devices 346 may include providing power to a power supply suitable for the particular device. This may include for example supplying power to a DC power source 396. The DC power source may then be operative to provide suitable DC power to transaction function devices that utilize DC power in their operation. Further it should be understood that although certain devices in the machine are not shown schematically connected to the power controller, in example embodiments such devices are appropriately connected to receive power therefrom. Further it should be understood that although only a single DC power supply is shown, embodiments may include multiple DC power supplies or other types of power supplies suitable for the particular types of devices used in the machine.

In an example embodiment inputs provided through the input device of the interface module are operative to cause the power controller 370 to carry out a series of steps in accordance with programmed sequences. These programmed sequences generally include supplying and shutting off power to the devices within the automated banking machine 340. For example if the automated banking machine 340 is in an unpowered state, a user such as a service technician may provide one or more inputs to the interface module indicating that the automated banking machine is to be started. In response to such an input to the interface module, the power controller 370 is operative responsive to communication with the interface module to execute a sequence which places the banking machine in operational mode. This may include for example operating to cause AC power to be supplied to the UPS 358 which delivers AC power to the terminal processor 342. The sequence may also include causing power to be delivered to the transaction function devices 346 in the machine. In example embodiments power may be supplied to the transaction function devices 346 so that such devices may operate to carry out their initialization routines in accordance with their imbedded software instructions. This may be done so that the devices are in a ready condition so that they can be recognized as present in the machine by the terminal processor as the terminal processor operates to start and place the automated banking machine in a normal operational mode.

In accordance with the programmed instructions which cause the power controller 370 to carry out the sequence, the power controller 370 may thereafter cause one or more messages to be sent to the terminal processor 342 which causes the terminal processor 342 to start. In response thereto the terminal processor 342 begins executing its programmed instructions, communicates to recognize the devices that are connected thereto, and verifies that the processor can carry out an appropriate terminal startup sequence. As a result in the example embodiment if there are no malfunctions, the terminal processor 342 will operate in accordance with its instructions to bring the automated banking machine 340 into an operative condition to carry out financial transactions.

Further in the example embodiment the power controller 370 may operate in response to at least one input to the interface module 378 to take the terminal to a shutoff condition. This may include for example, responsive to receiving at least one input through the interface module, causing the power controller 370 to send at least one message to the terminal processor 342, instructing the terminal processor 342 to shut down. In response to such message the terminal processor 342 will then go through a shutdown sequence. In the example embodiment during this time period the power controller maintains power supply to the transaction function devices. This may be done in some example embodiments so that an indication is maintained of the presence and operational status of such devices as the terminal processor is shutting down. As can be appreciated removal of power from the devices may result in indications being provided of a malfunction of the devices which the terminal processor 342 may react to in accordance with its programming before it is fully shut down.

In the example embodiment after the terminal processor 342 is shut down the power controller 370 operates in accordance with the program sequence to cause power to be shut off to the transaction function devices 346. As can be appreciated, in some embodiments this may be done simultaneously or sequentially as would be appropriate for the most reliable shutdown. Further in some example embodiments the power controller may operate to control the UPS 358 to shut off the supply of AC power to the terminal processor 342. Of course it should be understood that these approaches are example and in other embodiments other approaches may be used.

Further in the example embodiment the power controller 370 is operative to determine through its associated programming when the terminal processor 342 is instructed to shut down but does not do so. This may happen in some situations where processes are executing in ways that cannot be terminated through the shutdown command. In the example embodiment when the terminal processor 342 fails to respond to such a shutdown command the power controller 370 is operative to control of the UPS 358 to shut off AC power to the terminal processor 342. While this condition is generally not desirable, it is sometimes necessary in order to bring the automated banking machine back into operation. Of course these approaches are example and in other embodiments other approaches may be used.

In still other example embodiments the power controller 370 is operative to cause messages to be sent though the communication device 390 to the remote server 394. The messages are indicative of the power status of the various devices. Thus for example for purposes of remote monitoring and control of the automated banking machine the remote server may be operative to monitor the status of the terminal processor 342, UPS 358 and each of the transaction function devices 346 and other devices in the machine. In the event of a malfunction the device may cease to draw electrical power or may experience an electrical short or other condition which is detected through operation of the power controller 370. Appropriate messages can then be sent to give notification of this condition to a servicer or other entity associated with the remote server. In addition the power controller may operate in accordance with its programming to attempt to recover from such malfunctions. Of course this approach is example and in other embodiments other approaches may be used.

In an example embodiment, automated banking machine 340 may further include the use of a stepper motor 351, such as a voltage boosted stepper motor 351. The automated banking machine 340 may have similar features to machine 10 previously described herein except as discussed below. In the example embodiment, the voltage boosted stepper motor 351 may provide a more efficient motor that may aid in the overall conservation of power of the automated banking machine 340.

Figure 7:
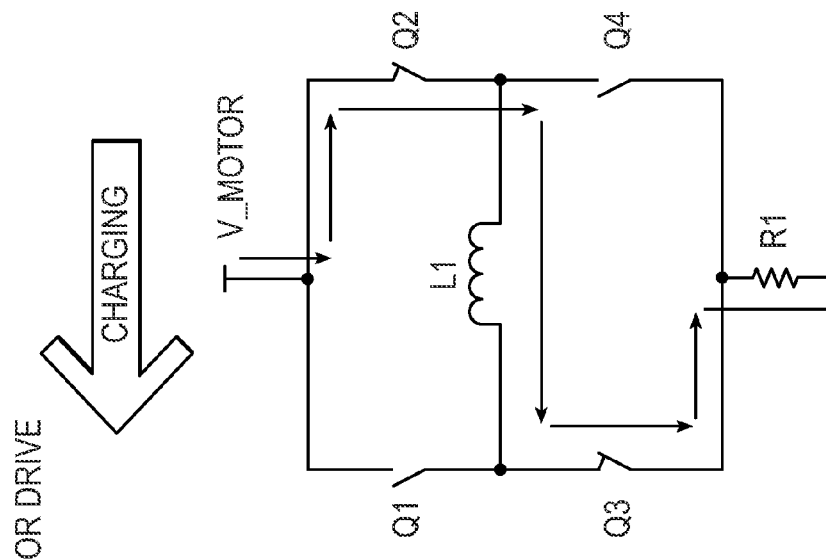
FIG. 7 is a circuit diagram of a traditional stepper motor drive illustrating a charging process.
Figure 6:
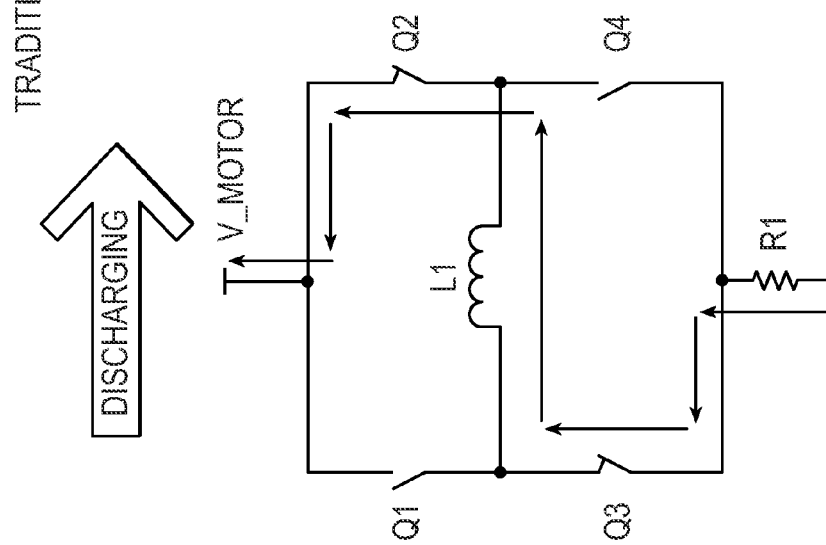
FIG. 6 is a circuit diagram of a traditional stepper motor drive illustrating a discharging process.

In general, a stepper motor is an electromagnetic device that converts digital pulses into mechanical shaft rotation, whereby a full rotation may be divided into a number of equal steps. FIGS. 6 and 7 illustrate a stepper motor drive circuit. The stepper motor may be operated in any appropriate manner, such as by a controller or processor 342, as shown in FIG. 5. The controller 342 may be a microprocessor capable of generating step pulses and direction signals for the driver. The driver may convert the controller 342 command signals into the power necessary to energize the motor windings.

The automated banking machine 340 of the example embodiment may include transaction function devices 346, as illustrated in FIG. 5. The transaction function devices 346 may include any appropriate devices, such as a card reader 348, a printer 350, a cash dispenser 352, etc. In the example embodiment, the voltage boosted stepper motor 351 may operate a document dispensing mechanism, such as the dispenser 30 previously discussed, as shown in FIGS. 2 and 3, and the cash dispenser 352, as shown in FIG. 5. It should be understood that these transaction function devices 346 are example, and in other embodiments other or different types of transaction function devices may be included in the automated banking machine.

Designing an efficient stepper motor drive may present various challenges, such as trying to minimize torque loss at high stepping rate. One obstacle may be that the relatively large stator inductance may take too much time to charge and discharge, especially with limited power supply voltage, which may cause loss of torque and eventually motor stall. In addition, burning out the stored energy in the stator inductor on higher voltages may only provide for a faster discharging rate, at the cost of loss of efficiency. One way to solve this problem may be to increase the power supply voltage for the motor drive; however, this solution may result in power supply system complexity and a considerable cost increase.

Some stepper motor drive designs (e.g. Diebold MMD and AFD unipolar stepper drive) may introduce a high voltage discharge circuit to burn the stored energy in the stator inductor quickly. This "burner" may be essentially made of a high voltage Zener diode with enough power dissipation. The higher the Zener voltage, the faster the stator inductor discharges. This method, however, may only address torque loss due to slow discharge, whereby the charging loss may be left as is. This method may also come with significant efficiency penalty, especially at a higher stepping rate.

Generally, as motor speed increases, torque decreases. The torque curve may be extended by using current limiting drivers and increasing the driving voltage (sometimes referred to as a "chopper" circuit). In addition, stepper motors with higher inductance coils may provide greater torque at low speeds and lower torque at high speeds as compared to stepper motors with lower inductance coils.

Another factor to consider when designing a stepper motor is that the motor performance may be strongly dependent on the drive circuit. Torque curves may be extended to greater speeds if the stator poles can be reversed more quickly, the limiting factor being the winding inductance. To overcome the inductance and switch the windings quickly, the drive voltage must be increased. This may require limiting the current that these high voltages may induce.

Stepper motors may be rated with varying degrees of inductance. As discussed above, a high inductance motor may provide a greater amount of torque at low speeds and lower torque at higher speeds. Speed and torque performance of the step motor may be based on the flow of current from the driver to the motor winding. The factor that inhibits the flow, or limits the time it takes for the current to energize the winding, is known as inductance. The lower the inductance, the faster the current gets to the winding and the better the performance of the motor. To reduce the effects of inductance, most types of driver circuits may be designed to supply a voltage greater than the motor's rated voltage.

The higher the output voltage from the driver, the higher the level of torque versus speed. The voltage may be the driver of the current. The higher the voltage, the faster will the current in the windings may reach its new target value from one step to the next. Therefore, a higher voltage motor may result in better speed performance. Torque versus speed behavior may vary across stepping motors. For example, the higher the inductance, the worse the performance may be at higher speeds. The higher the voltage, the better the performance may be.

Motor windings may have some internal resistance. This resistance may be a function of wire diameter, the number of turns and the resistivity of the winding material. This resistance may be what determines the maximum current that a winding should be subjected to. Stepping motor performance may be improved by driving these motors at a voltage greater than what they are rated for. If higher voltage is used to boost performance, then current limiting considerations should be taken into account.

Stepping motors may often be run at voltages higher than their rated voltage, as mentioned above. While this may not be the case for small stepper motors, high torque stepper motors may need to be run at higher voltages in order for the motor to reach its full potential. Increasing the voltage supplied to a motor may increase the rate at which current rises in the windings of the motor. The more responsive the current is in the windings, the greater the torque and speed characteristics of the motor.

Figure 16:
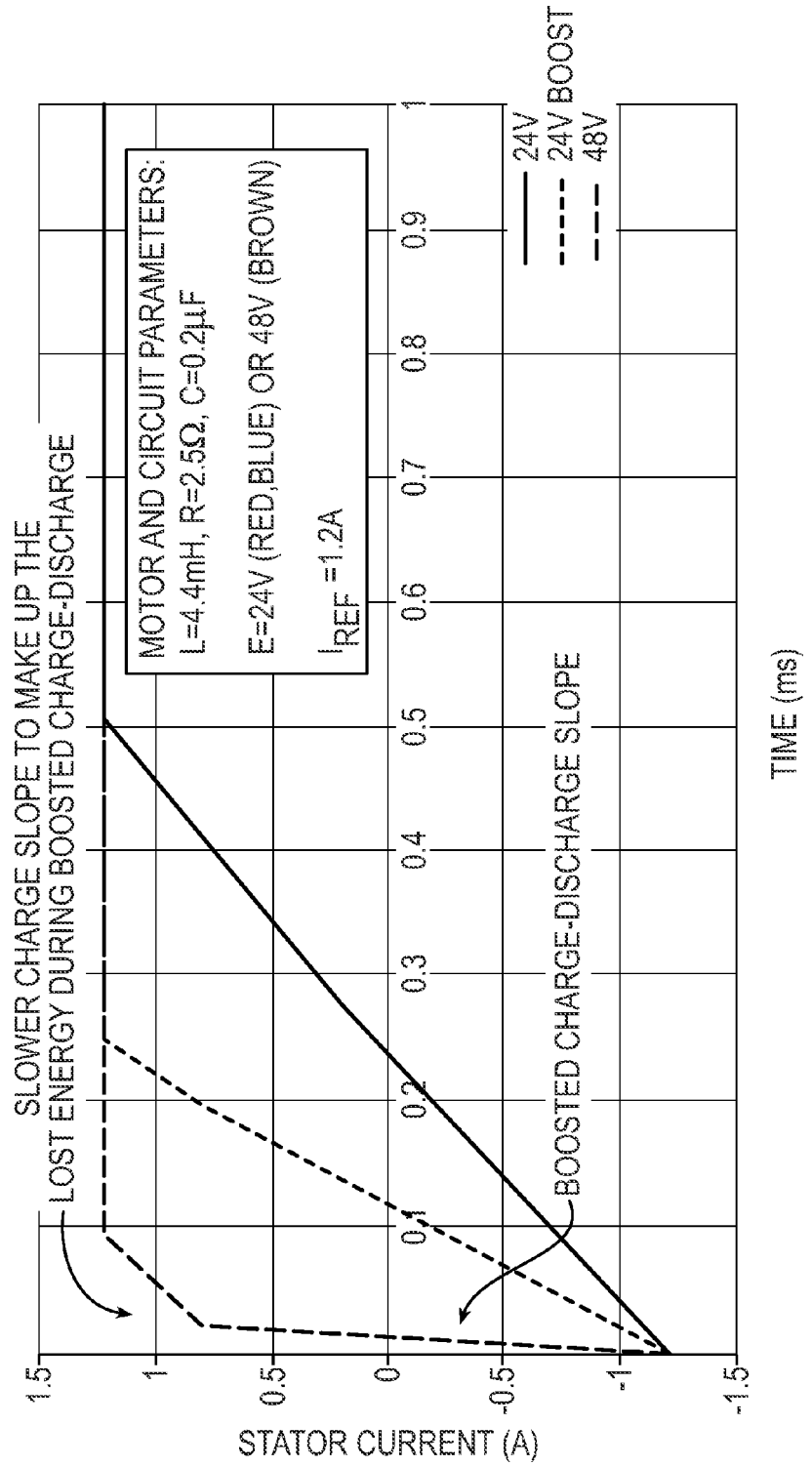
FIG. 16 is a graph illustrating a theoretical stator current curve charge-discharge speed comparison.
Figure 17:
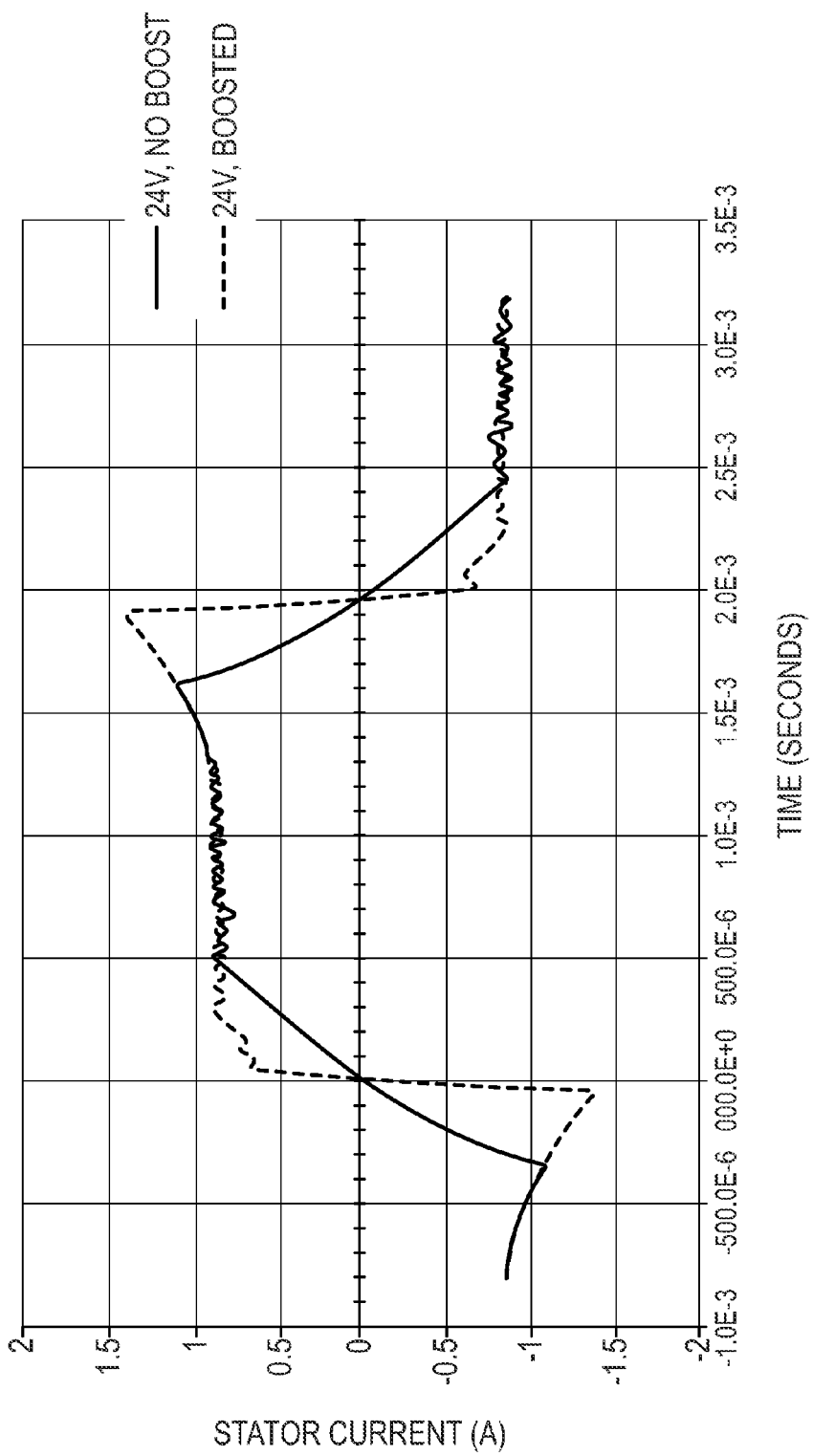
FIG. 17 is a graph illustrating a measured stator inductor current waveform comparison.
Figure 18:
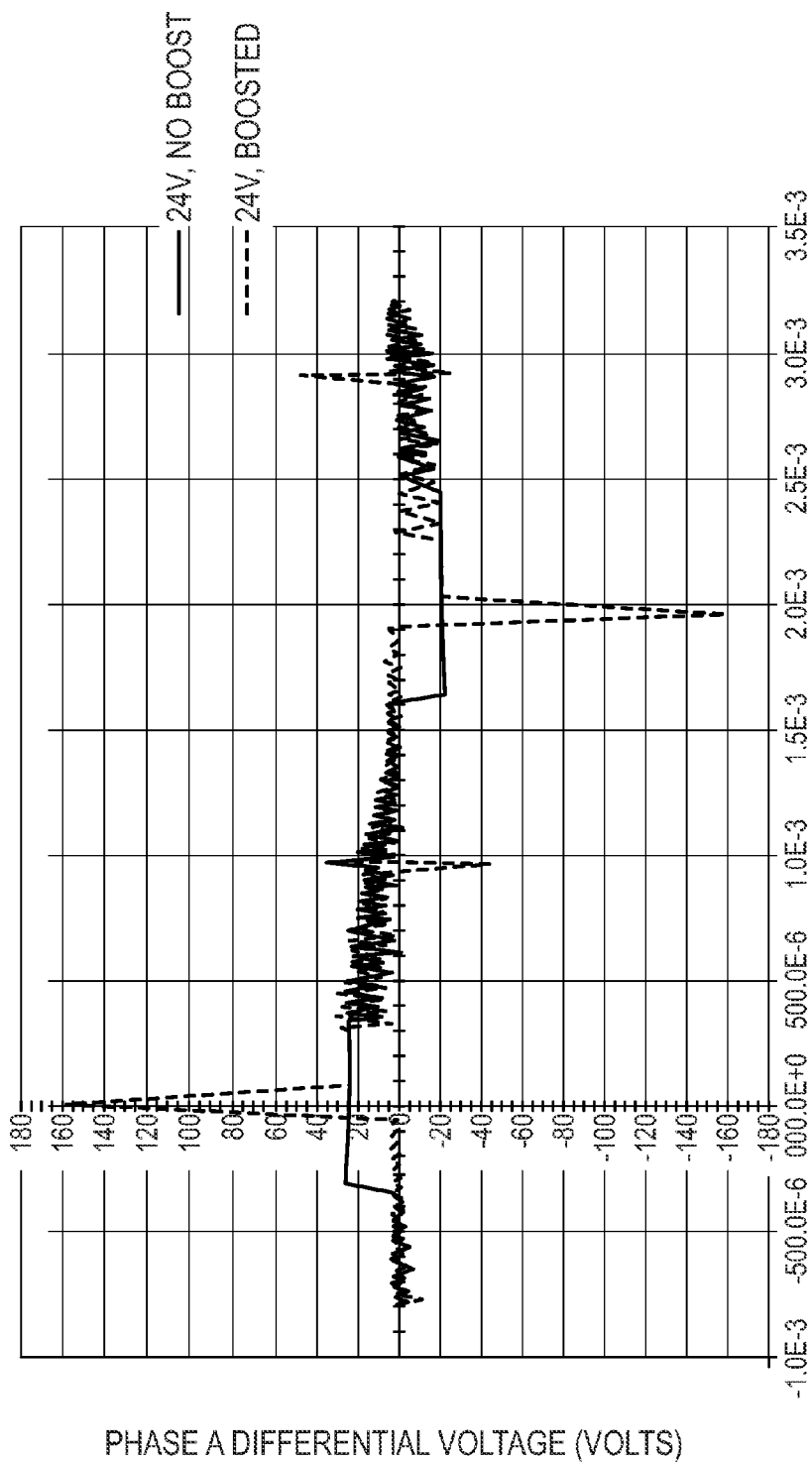
FIG. 18 is a graph illustrating a measured stator inductor voltage waveform comparison.

In the example embodiment, the boosted stepper motor 351 may provide a gain on the stepping rate for a given power supply by utilizing a blocking diode D1 and a boost capacitor C1, as shown in FIGS. 9-13. The boosted stepper motor 351 may make full use of the energy stored in the stator inductor L1 and convert it into a virtual high voltage source to help accelerate both discharging and charging process, as illustrated in FIGS. 16-18.

In the example embodiment, the boost capacitor C1 may be added to hold the energy converted from that stored in the stator inductor. The blocking diode D1 may be added to block the stator inductor L1 from discharging into the power supply, V_motor, so that it may only be directed into the added capacitor C1. For illustrative purposes only, an NMB size 23 stepper running at 24V with the boosted drive may outperform the same motor running at 48V without the boosted drive.

In one example embodiment, the motor 351 may utilize a bipolar stepper boosted drive circuit, as shown in FIGS. 9-13. Generally, bipolar stepper motors may be composed of two windings and have four wires. Current flow in the winding of a bipolar motor may be bidirectional, as shown in FIGS. 16 and 17. This may require changing the polarity of each end of the windings.

Bipolar motors may have more torque than an equivalent unipolar motor of the same volume. This is because only one half of a winding is energized at any given time in a unipolar motor. A bipolar motor utilizes the whole of a winding when energized.

The basic control circuit for driving the windings of a bipolar motor is an H-bridge, as shown in FIGS. 9-13. The H-bridge may be used to change the polarity on the ends of one winding. As discussed above, bipolar motors generally have two windings, therefore, two H-bridge control circuits may be used for the motor. The H-bridge is an electronic circuit that may enable a voltage to be applied across a load in either direction. The H-bridge arrangement may generally be used to reverse the polarity of the motor.

The H-bridge may be configured to allow current to flow in either direction across a winding. Current may flow from left to right in a winding when the Metal-Oxide-Semiconductor Field-Effect Transistors (MOSFETs) Q1 and Q4 are turned on and Q2 and Q3 are turned off. Current may flow from right to left when Q2 and Q3 are on and Q1 and Q4 are off. Transistors Q2 and Q4 may be N-channel MOSFETs and therefore require a positive bias on turn-on. Q1 and Q3 may be P-channel MOSFETs, requiring a negative bias to turn-on.

When the switches Q1 and Q4 are closed (and Q2 and Q3 are open) a positive voltage may be applied across the motor. By opening Q1 and Q4 switches and closing Q2 and Q3 switches, this voltage may be reversed, allowing reverse operation of the motor. The switches Q1 and Q2 should never be closed at the same time, as this would cause a short circuit on the input voltage source. The same applies to the switches Q3 and Q4.

To achieve full rated torque, the coils in a stepper motor must reach their full rated current during each step. Winding inductance and reverse EMF generated by a moving rotor tend to resist changes in drive current, so that as the motor speeds up, less and less time is spent at full current, thus reducing motor torque. As speeds further increase, the current may not reach the rated value, and eventually the motor may cease to produce torque.

In the example bipolar stepper boosted drive circuit embodiment, and as shown in FIGS. 9-13, L1 is the stator inductor, R1 is the current sensing resistor, and V_motor is the motor power supply. Q2 and Q4 are N-channel while Q1 and Q3 being P-channel, with their body diodes explicitly shown.

If C1 is removed and D1 is shorted, this would become the typical H-bridge for driving a bipolar stepper (two H-bridges needed, only one shown, as shown in FIGS. 6 and 7). Charging and discharging the stator would follow the typical first order R-L circuit equations (1) and (2) as discussed below.

Figure 10:
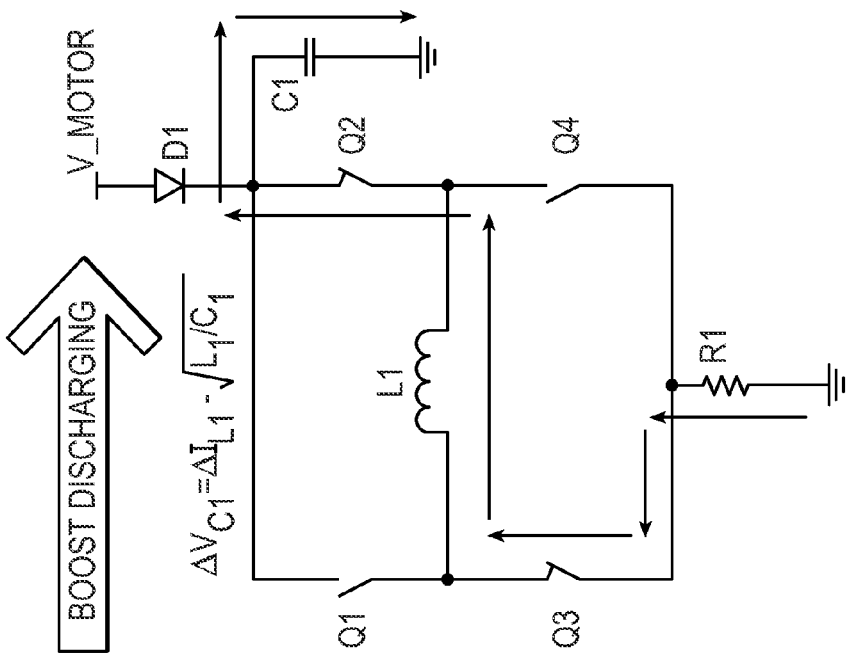
FIG. 10 is a circuit diagram of an example embodiment of a bipolar stepper motor drive illustrating an example initial charging process.
Figure 11:
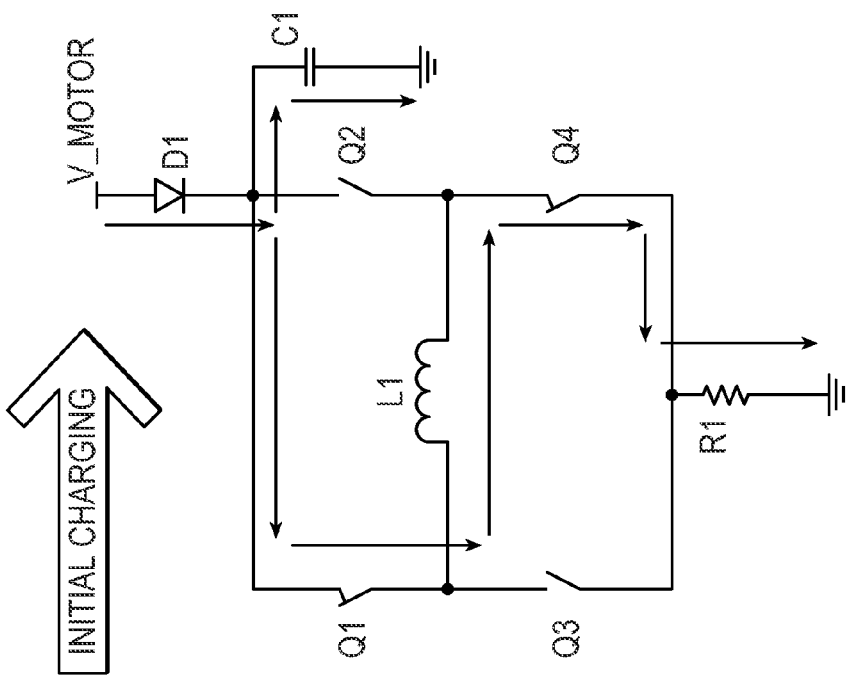
FIG. 11 is a circuit diagram of an example embodiment of a bipolar stepper motor drive illustrating an example boost-discharging process.

A benefit of the boosted stepper motor drive 351 may be accomplished by introducing the blocking diode D1 and boost capacitor C1. As shown in FIGS. 10 and 11, when switching phase from Q1 & Q4 on (Q2 & Q3 off) to Q2 & Q3 on (Q1 & Q4 off), the energy stored in L1 in the form of $$E_{L1} = \frac{1}{2} L_1 I^2$$

cannot be charged back to V_motor (as the case in a traditional bipolar stepper motor drive, as shown in FIGS. 6 and 7) due to the blocking diode D1.

This energy $E_{L1}$ in L1 has nowhere to go but being all "sucked" (charged) into C1, as shown in FIG. 11, in the form $$E_{C1} = \frac{1}{2}C_1(\Delta V)^2.$$

As the current in L1 reaches zero, the voltage in C1 also arrives to its peak value of $V_P$=V_motor+ΔV. It should be noted that Vp can be much greater than V_motor. Because of the same blocking diode D1, the energy $E_{C1}$ stored in C1 also has nowhere to go but being charged back into the stator inductor, as shown in FIG. 12.

The stator current discharge process (energy as current in L1 converted to delta voltage in C1) and its recharge process (energy as delta voltage in C1 converted back to current in L1 with opposite direction) can be much faster with boost than it can be without boost, as shown in FIGS. 16 and 17.

Qualitatively speaking, this is because the average voltage on C1 during boosted discharge and recharge processes can be significantly greater than V motor, with proper choice of capacitor C1, as discussed below.

Due to the resistance induced energy loss in the discharge and recharge process, at the end of the boosted recharge process, the current level in L1 will be less than what it is when the discharge process starts. Therefore, the blocking diode D1 will be on for a (short) period of time to make up the loss until the stator current is charged up to the original level. This process is therefore referred to as "make up" charge process.

Figure 8:
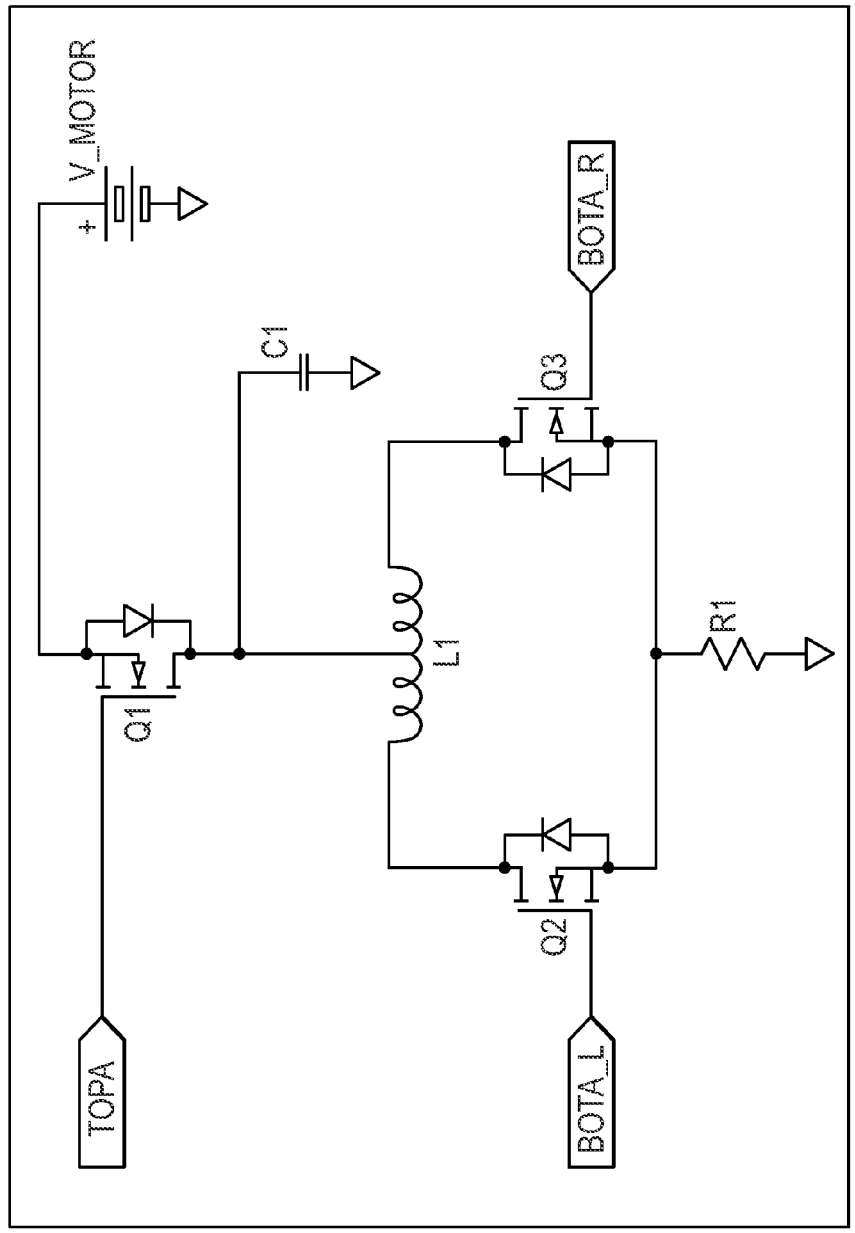
FIG. 8 is a circuit diagram of an example embodiment of an unipolar stepper boosted drive circuit.
Figure 9:
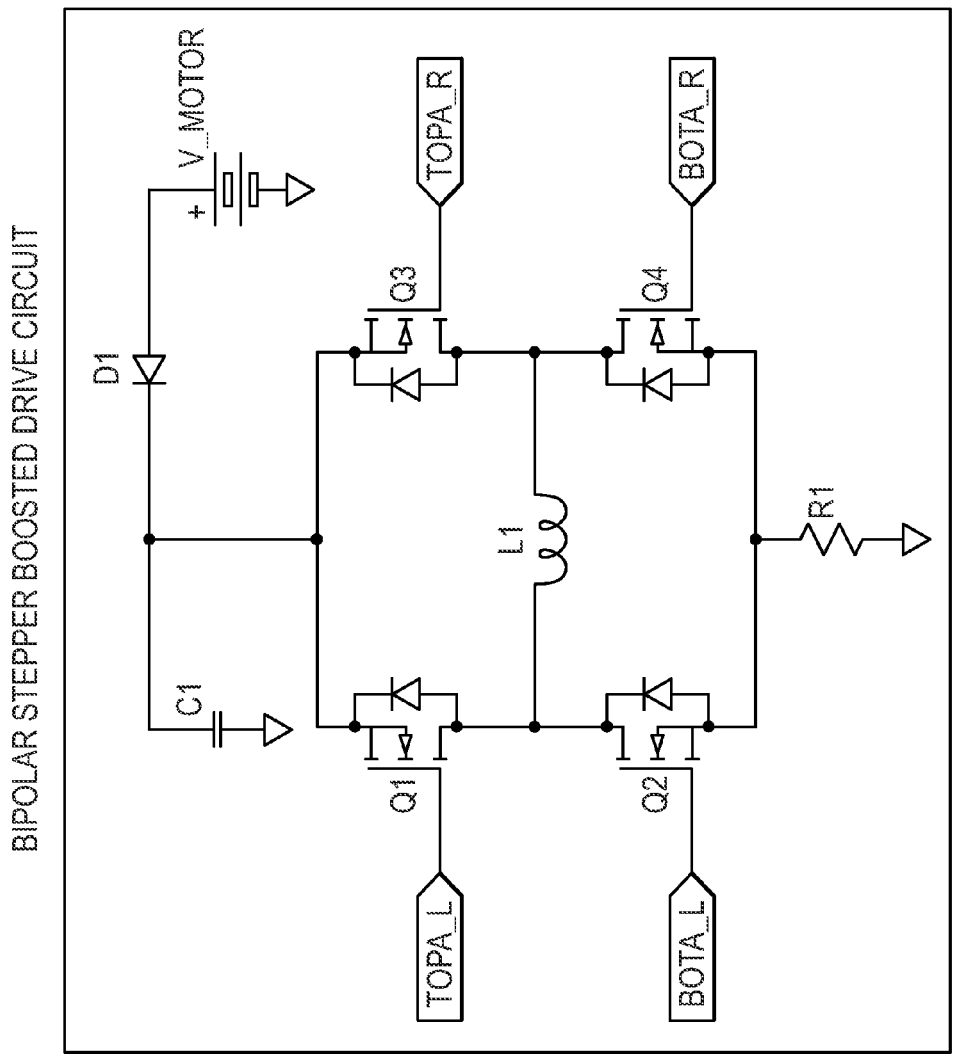
FIG. 9 is a circuit diagram of an example embodiment of a bipolar stepper boosted drive circuit.

In another example embodiment, the motor may utilize a unipolar stepper boosted drive circuit, as shown in FIG. 8. Generally, a unipolar stepper motor may have one winding with a center tap per phase, whereby there may be two windings, each with a center tap. The name unipolar is derived from the fact that current flow is limited to one direction. Each section of windings is switched on for each direction of magnetic field.

The center tap wire(s) may be tied to a power supply and the ends of the coils may be alternately grounded. Unipolar stepper motors may operate by attracting the north or south poles of the permanently magnetized rotor to the stator poles. Thus, in these motors, the direction of the current through the stator windings may determine which rotor poles may be attracted to which stator poles. Current direction in unipolar motors may be dependent on which half of a winding is energized. One winding may act as either a north or a south pole depending on which half is powered.

An example of a unipolar stepper boosted drive circuit embodiment, is illustrated in FIG. 8. R1 is the current sensing resistor, Q1-Q3 are N-channel MOSFET, L1 is the unipolar stator inductor (with center tap), V_motor is the power supply, the body diode Q1 will be the blocking diode and C1 is the boost capacitor.

If C1 were removed and Q1 shorted, the circuit above would become one of the standard circuits for driving a unipolar stepper (two sets needed, only one shown). Charging and discharging the stator would follow the typical first order R-L circuit equation (1) and (2) as shown later.

Similar to the bipolar case discussed above, a benefit of the boosted stepper motor drive 351 is accomplished by introducing the blocking diode (i.e., the body diode Q1) and boost capacitor C1, as shown in FIG. 8. When switching phase from Q2 on Q3 off to Q3 on Q2 off, the energy stored in L1 in the form $$E_{L1} = \frac{1}{2}L_1 I^2$$

of cannot be charged back to V motor (as the case in a normal unipolar stepper drive) due to the body diode Q1.

This energy $E_{L1}$ in L1 has nowhere to go but being all "sucked" (charged) into C1 in the form of $$E_{C1} = \frac{1}{2}C_1(\Delta V)^2.$$

As the current in L1 reaches zero, the voltage in C1 also arrives to its peak value of VP=V_motor+ΔV. It should be noticed that $V_P$ can be much greater than V_motor. Because of the same blocking (body) diode in Q1, the energy $E_{C1}$ stored in C1 also has nowhere to go but being charged back into the stator inductor L1.

As discussed above, in the example embodiment, the stator current discharge process (energy as current in L1 converted to delta voltage in C1) and its recharge process (energy as delta voltage in C1 converted back to current in L1 with opposite direction) can be much faster with boost than it can be without boost.

Qualitatively speaking, this is because the average voltage on C1 during the boosted discharge and recharge processes may be significantly greater than V_motor, with proper choice of capacitor C1, as discussed below. The similar "make up" charge is also needed for the same reason as described in the bipolar case.

One difference in the unipolar drive circuit is that the blocking diode does need to be shorted when the stator current has reached the original (specified) level and current chopping may also be employed to keep the stator current at the specified level. In this case, the stator current must find its way back to power supply to keep the current from dropping too fast. This is when Q1 needs to be turned on, for proving such a path for stator current to go through. The control signal of Q1 (TOPA in FIG. 8) will turn it on during chopping and keep it off otherwise. Since Q1 is an N-channel MOSFET, it may be necessary that either a higher auxiliary supply voltage or a bootstrap circuit be provided for its gate drive.

Chopper drive circuits may be referred to as constant current drives as they generate a somewhat constant current in each winding rather than applying a constant voltage. On each new step, a very high voltage may be applied to the winding initially. This causes the current in the winding to rise quickly. The current in each winding may be monitored by the controller, usually by measuring the voltage across a small sense resistor with each winding. When the current exceeds a specified current limit, the voltage may be turned off or "chopped," typically using power transistors, such as the N-channel MOSFET discussed above. When the winding current drops below the specified limit, the voltage may be turned on again. In this way, the current is held relatively constant for a particular step position. This may allow the stepper motor to be driven with higher torque at higher speeds.

Next, the stator current charge and discharge process is discussed. The motor (stator) charging current I(t) may follow the RL charging equation:

$$I_{Charge(t)} = \frac{E}{R}(1 - e^{-\frac{t}{\tau}}) = I_\infty(1 - e^{-\frac{t}{\tau}}) \quad (1)$$

Where $I_\infty = E/R$ is the destination current, $\tau = L/R =$ is the time constant, E is the power supply voltage, L is the stator inductance and R is the total resistance of the system, including stator resistance, on-resistance of the switches, current sampling resistance, trace resistance, and etc. As for the stator current discharge curve with initial stator current $I_0$, we have:

$$I_{Discharge(t)} = I_0 e^{-\frac{t}{\tau}} \quad (2)$$

Figure 14:
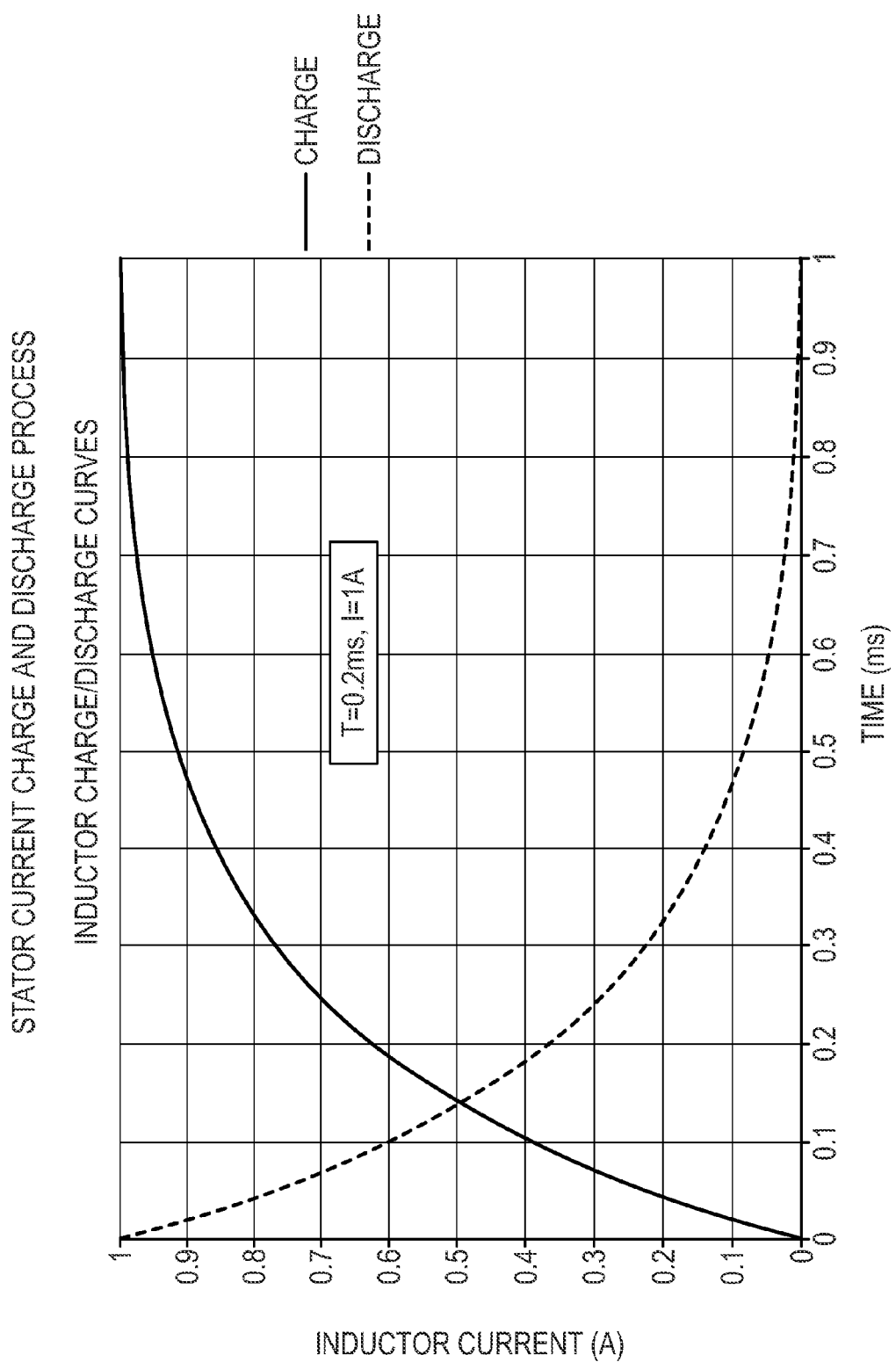
FIG. 14 is a graph illustrating a stator current charge and discharge process illustrating example inductor charge/discharge curves.

FIG. 14 shows the charge current (black curve) and discharge current (grey curve) respectively, with the time constant $\tau = 0.2$ ms and target current level $I_\infty = 1$A (for reference only).

Figure 15:
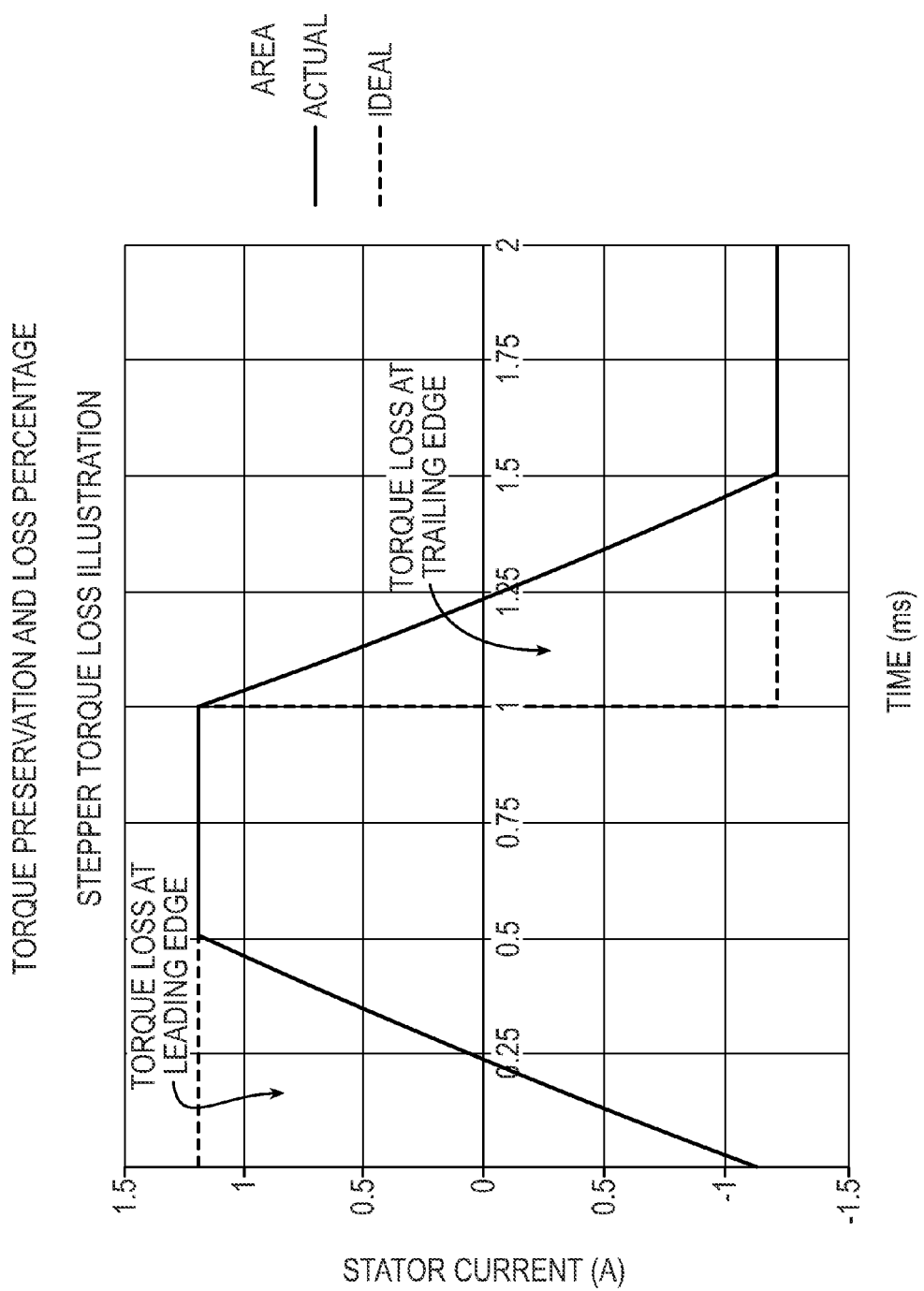
FIG. 15 is a graph illustrating a torque preservation and loss percentage.

With reference to FIG. 15, the torque preservation and loss percentage is discussed. Suppose the current limit has been set to $I_S$, then the time $t_S$ needed to charge the inductor current to this level can be expressed as ($\tau$, E and R as defined before):

$$t_s = \tau \cdot \ln\left(\frac{E}{E - I_S R}\right) \quad (3)$$

If the stepping pulse phasing interval (twice of the stepping pulse width $T_P$) $T_{PH}$ is greater than $t_s$ then the stator current can be charged up to the current limit $I_s$ in time (this will be case 1 in the area under curve discussion below), otherwise it will not be able to reach the current limit (case 2).

Nevertheless, as shown in FIG. 15, the torque loss of the stepper motor is proportional to the ratio between the "ideal area" under the curve $A_{MAx}$ and the "lost area" under the curve $A_{LOST}$ when the stator current is going from $-I_S$ up to $I_S$ and vice versa.

Without losing generality, we can assume the stator current is charging from 0 up to $I_M = 2I_s$ and then discharging from $I_M$ down to 0. Before (or up to) the point when stator current reaches the preset limit (i.e. Im), the area $A(x)$ under the charging current curve (from t=0 to t=x) can be calculated as:

$$A(X) = \int_0^x I_\infty(1 - e^{-\frac{t}{\tau}}) dt = I_\infty\left[x - \tau(1 - e^{-\frac{x}{\tau}})\right] \quad (4)$$

It is seen that $A(0)=0$ and $A_{(\tau)}=I_\infty \cdot \tau \cdot e^{-1}$ Substitute $I_S$ with $I_M$ in formula (3) above we can obtain:

$$t_M = \tau \cdot \ln\left(\frac{E}{E - I_M R}\right) \quad (5)$$

Where $t_M$ is defined as the time needed for the stator inductor to charge from 0 to $I_M$ (equivalent to its going from $-I_S$ to $I_S$). It is easily seen that the "ideal area" under the curve $A_{MAX}$ may be the product of $I_M$ and $T_{PH}$, that is, $A_{MAX}=I_M T_{PH}$ Here "ideal" means that the stator current may take no time to change from 0 to $I_M$ physically impossible but may be approximated when $t_M$ is much smaller than $T_{PH}$.

The torque loss may come in two areas, as seen in FIG. 15. The first area $A_{LC}$ may be due to (the slower than ideal) leading edge of the stator current. The second area $A_{LD}$ on the other hand, may be due to (less than ideal) trailing edge of the stator current. It may be shown that $A_{LD}=A(t_M)$ for $t_M < T_{PH}$, otherwise $A_{LD}=A(T_{PH})$.

Depending on $t_M$ the time needed for the stator inductor to charge from 0 to $I_M$ and the stepping pulse phasing interval $T_{PH}$, there will be two cases:

Case 1—In this case, the charging current is NOT able to reach the preset limit $I_M$ before the end of the phasing pulse, i.e. $t_M \geq T_{PH}$ It may be proved that in this case, we have:

$$A(T_{PH}) = I_\infty\left[T_{PH} - \tau(1 - e^{-\frac{T_{PH}}{\tau}})\right] \quad (6)$$

It may be proved that in this case the stepper motor may lose 100% of its torque. This may be because the exact amount of torque seemingly gained during stator charging may all be lost during discharging.

Case 2—In this case, the charging current may reach the limit before the end of the phasing pulse, or $t_M < T_{PH}$, therefore we have:

$$A(T_{PH}) = I_\infty\left[T_{PH} - \tau(1 - e^{-\frac{t_M}{\tau}})\right] \quad (7)$$

In this case, the torque loss due to the leading edge charge current is $A_{LC}=I_M*t_M-A(t_M)$. It may be seen that the torque loss due to discharging current is $A_{LD}=A(t_M)$ Therefore the total torque loss ALT is:

$$A_{LT}=A_{LC}+A_{LD}=I_M t_M \quad (8)$$

The torque preservation percentage η is therefore defined as the ratio of $A_{LT}$ over $A_{MAX}$, or $$\eta = \frac{A_{LT}}{A_{MAX}} = \begin{cases} 0 & \text{for } t_M \geq T_{PH} \\ \frac{t_M}{T_{PH}} & \text{for } t_M < T_{PH} \end{cases} \quad (9)$$

Accordingly, $\zeta=1-\eta$ will be denoted as the torque loss percentage.

From the discussion above, the stator charging current I(t) may follow the equation $$I(t) = \frac{E}{R}(1 - e^{-t/\tau}),$$

where $\tau=L/R$ is the time constant. When $t/\tau$ relatively very small, the first order approximation of $e^X \approx 1+X$ may be used, and therefore:

$$I(t) \approx \frac{E}{L}t \quad (10)$$

This may also be viewed as the case of inductance dominating during the charging process so that the effect of resistance may be ignored.

As for the stator inductor discharge current, $(t)=I_0 e^{-t/\tau}$, where $\tau=L/R$ as before and $I_0$ is the initial inductor current. When $t/\tau$ is relatively very small, the first order approximation of $e^x \approx 1+x$ may also be used, to obtain the following:

$$I(t) \approx I_0(1-t/\tau) \quad (11)$$

In terms of the circuit analysis, whether it is unipolar or bipolar, the boosted stepper motor drive 351 may be modeled by a typical RLC circuit during the energy transition period when the energy stored in the stator inductor $$E_{L1} = \frac{1}{2} L_1 I^2$$

is first converted to the energy stored in the boost capacitor $$E_{C1} = \frac{1}{2} C_1 (\Delta V)^2$$

and then converted back to the energy in stator inductor (of a lower level due to energy loss on the resistance in the RLC circuit).

The current i(t) in a series RLC circuit may follow the following differential equation:

$$L\frac{d^2 i(t)}{dt^2} + R\frac{d i(t)}{dt} + \frac{1}{C}i(t) = 0, \quad (12)$$

or $$\frac{d^2 i(t)}{dt^2} + \frac{R}{L}\frac{d i(t)}{dt} + \frac{1}{LC}i(t) = 0$$

As defined $$2\alpha = \frac{R}{L}, \ (\omega_0)^2 = (LC)^{-1},$$

we can obtain:

$$\frac{d^2 i(t)}{dt^2} + 2\alpha \frac{d i(t)}{dt} + \omega_0^2 \cdot i(t) = 0 \quad (13)$$

The corresponding characteristic equation is:

$$\lambda^2 + 2\alpha\lambda + \omega_0^2 = 0 \quad (14)$$

In most stepper applications, there may normally be underdamped solutions, or $$\alpha < \omega_0, \text{ or } R < \frac{2}{\sqrt{C/L}} \quad (15)$$

The circuit may have a Q factor defined as:

$$Q = \frac{\omega_0}{2\alpha} = \frac{1}{R}\sqrt{\frac{L}{C}} \quad (16)$$

Generally, with an under-damped situation, the solution of (14) may be written as:

$$\lambda = -\alpha \pm j\sqrt{\omega^2 - \alpha^2} = -\alpha \pm j\omega_n \quad (17)$$

Therefore, the general solution for (13) may be written as:

$$i(t) = e^{-\alpha t}[A \sin(\omega_n t) + B \cos(\omega_n t)] = K \cdot e^{-\alpha t} \cdot \cos(\omega_n t + \phi) \quad (18)$$

Coefficients A and B or K and φ may be determined by initial conditions. K and φ may be derived from A and B, or vice versa.

In an illustrative embodiment, utilizing the size 23 NMB stepper motor discussed above, r=2Ω, L=4.4 mH and C=0.22 µF, switch and sensing resistance may be 0.5Ω so that R=2.5Ω. This means that:

$$\alpha = .05 * \frac{2.5}{0.0044} = 284$$

and $\omega_0 = 1/(2.5*0.22*1e-9)^{0.5} = 32141$ rad and $\omega_n = (32141^2 + 284^2)^{0.5} = 32141 \approx \omega_0$.

This gives a natural frequency, $f_0 = 32141/\pi = 5115$ Hz.

The half cycle time of this frequency may be about 98 µs, and the Q factor may be:

$$Q = \frac{1}{R}\sqrt{\frac{L}{C}} = \frac{1}{2.5\Omega}\sqrt{\frac{4.4 \text{ mH}}{0.22 \text{ µF}}} = 56.6$$

The energy loss $W_{Discharge}$ (on the total circuit resistance R consisting of stator resistance r_stator, on-resistance of MOSFET switches, current sensing resistance and the like) during the discharge half cycle may be described as the following integration (assuming $e^{-\alpha t} \approx 1$ and $\omega_n \approx \omega_0$ within integration interval)

$$W_{Discharge} = \int_{\omega_0 t = -\pi/2}^{\omega_0 t = 0} I^2 R \cdot \sin^2 \omega_0 t \cdot dt = \frac{I^2 R}{4 f_0} \quad (19)$$

Similarly, the energy loss $W_{Recharge}$ may be written as:

$$W_{Recharge} = \int_{\omega_0 t = 0}^{\omega_0 t = \pi/2} I^2 R \cdot \left(1 - \frac{1}{4} f_0\right) \cdot \sin^2 \omega_0 t \cdot dt \quad (20)$$

$$= \frac{I^2 R}{4 f_0}\left(1 - \frac{1}{4} f_0\right)$$

$$\approx \frac{I^2 R}{4 f_0}$$

Therefore the total energy loss $W_{Total}$ may be $$W_{TOTAL} = w_{Discharge} - W_{Recharge} = \frac{I^2 R}{4 f_0}\left(2 - \frac{1}{4} f_0\right) \approx \frac{I^2 R}{2 f_0} \quad (21)$$

Assuming that the original (low voltage) power supply is $E_M$, then the virtual boost power supply $E_B$ may be viewed as an equivalent (high voltage) power supply being switched in during phase change to speed up the transition (i.e., stator current discharge and recharge). The voltage $E_B$ may be derived as $E_B = E_M + \Delta V$ where $\Delta V$ may be the average delta voltage on the capacitor.

Thus example embodiments achieve at least some of the above stated objectives, eliminate difficulties encountered in the use of prior devices and systems, solve problems, and attain the desirable results described herein.

In the foregoing description, certain terms have been used for brevity, clarity, and understanding, however, no unnecessary limitations are to be implied therefrom because such terms are used for descriptive purposes and are intended to be broadly construed. Moreover, the descriptions and illustrations herein are by way of examples and the invention is not limited to the exact details shown and described.

In the following claims any feature described as a means for performing a function shall be construed as encompassing any means known to those skilled in the art as being capable of performing the recited function, and shall not be deemed limited to the particular means shown in the foregoing description or mere equivalents thereof. The provisions of an Abstract herewith shall not be construed as limiting the claims to features discussed in the Abstract.

Having described the features, discoveries and principles of the invention, the manner in which it is constructed and operated, and the advantages and useful results attained; the new and useful structures, devices, elements, arrangements, parts, combinations, systems, equipment, operations, methods, processes and relationships are set forth in the appended claims.

I claim:

1. An apparatus comprising:
a power supply;
a power controller coupled with the power supply;
a dispensing mechanism coupled with the power controller;
a stepper motor coupled with the dispensing mechanism and the power controller, the stepping is operable to operate the dispensing mechanism; and
a transaction processor coupled with the power controller;
wherein the transaction processor is operable to operate the stepper motor to operate the dispensing mechanism for a transaction;
wherein the stepper motor is a voltage boosted stepper motor; and
wherein the stepper motor further comprises a stator; and
a body diode coupled with the stator.

2. The apparatus set forth in claim 1, wherein the stepper motor is a unipolar stepper motor.

3. The apparatus set forth in claim 2, further comprising a boost capacitor coupled with the body diode.

4. The apparatus set forth in claim 1, wherein the stepping motor is a bipolar stepping motor.

5. The apparatus set forth in claim 4, wherein the stepper motor further comprises a boost capacitor coupled with the blocking diode.

6. The apparatus set forth in claim 5, further comprising two H-bridge control circuits coupled with the stepping motor.

7. The apparatus set forth in claim 1, wherein the dispensing mechanism is a cash dispenser.

8. The apparatus set forth in claim 1, further comprising an uninterruptable power supply coupled with the power controller and the processor.

9. The apparatus set forth in claim 1, further comprising a card reader coupled with the transaction processor.

10. The apparatus set forth in claim 1, further comprising a printer coupled with the transaction processor.

11. An apparatus comprising:
an automated banking machine, the automated banking machine comprises:
a card reader, wherein the card reader is operative to read from user cards, card data that corresponds to financial accounts,
a display,
a receipt printer,
a cash dispenser,
a voltage boosted stepper motor coupled with the cash dispenser and operable to operate the cash dispenser,
a terminal processor,
wherein the terminal processor is in operative communication with the card reader, the display, the receipt printer, the stepper motor and the cash dispenser,
wherein the terminal processor is operative in carrying out a financial transaction to:
cause user card data to be read from a user card through operation of the card reader,
determine that the user card data corresponds to a financial account authorized to have the transaction conducted through operation of the machine,
operate the cash dispenser to dispense cash responsive at least in part to determining that the user card data corresponds to a financial account authorized to have the transaction conducted through operation of the machine,
asses the financial account to a value corresponding to the dispensed cash, and
produce a receipt corresponding to the value via the receipt printer;
a battery,
a plurality of power sources other than the battery, wherein the plurality of power sources include a solar panel,
a power control processor, wherein the power control processor is in operative connection with the at least one battery and each of the plurality of power sources,
wherein the at least one power control processor is operative to cause the at least one battery to be charged by power supplied by a battery charger,
wherein the at least one power control processor is operative to cause power to be delivered from the solar panel to at least one of the card reader, the display, or the receipt printer,
wherein during the transaction, the at least one power control processor is operative to:
(a) determine at least one amount of power required to operate at least one of the display, the card reader, or the receipt printer,
(b) determine power currently available from each of the plurality of power sources,
(c) cause power to be delivered to the cash dispenser from the at least one battery, and
(d) cause power to be delivered from the plurality of power sources to at least one of the card reader, the display, or the receipt printer, responsive at least in part to at least one of the (a) or (b) determinations.

* * * * *